US007208902B2

(12) United States Patent
Yamane

(10) Patent No.: US 7,208,902 B2
(45) Date of Patent: Apr. 24, 2007

(54) DIGITAL SPEED CONTROLLING APPARATUS, DIGITAL MOTOR CONTROLLING APPARATUS, PAPER CONVEYING APPARATUS, DIGITAL SPEED CONTROL METHOD, PROGRAM FOR MAKING COMPUTER EXECUTE THIS METHOD, COMPUTER-READABLE RECORDING MEDIUM, AND IMAGING FORMING APPARATUS

(75) Inventor: Jun Yamane, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 11/422,755

(22) Filed: Jun. 7, 2006

(65) Prior Publication Data

US 2007/0007925 A1 Jan. 11, 2007

(30) Foreign Application Priority Data

Jul. 7, 2005 (JP) ............................ 2005-199080

(51) Int. Cl.
*G05B 19/29* (2006.01)

(52) U.S. Cl. ...................... 318/600; 318/560; 318/461; 318/632

(58) Field of Classification Search ................ 318/600, 318/560, 461, 432, 434, 638, 569
See application file for complete search history.

(56) References Cited

U.S. PATENT DOCUMENTS 4,458,471 A * 7/1984 Herwig .................... 56/10.2 G
5,130,748 A * 7/1992 Tanaka ........................ 399/16
5,331,267 A * 7/1994 Anderson ................... 318/799
6,114,818 A * 9/2000 Ohtsubo et al. .............. 318/49
6,712,906 B2 * 3/2004 Estelle et al. ............... 118/683

FOREIGN PATENT DOCUMENTS

| | | |
|---|---|---|
| JP | 3271440 | 1/2002 |
| JP | 2003-108229 | 4/2003 |
| JP | 2003-204690 | 7/2003 |
| JP | 2004-13810 | 1/2004 |
| JP | 2004-40839 | 2/2004 |
| JP | 2004-98678 | 4/2004 |
| JP | 2004-129488 | 4/2004 |
| JP | 2004-215370 | 7/2004 |
| JP | 2004-312992 | 11/2004 |
| JP | 2004-343859 | 12/2004 |
| JP | 2004-357374 | 12/2004 |
| JP | 2005-14297 | 1/2005 |

* cited by examiner

*Primary Examiner*—Rina Duda
(74) *Attorney, Agent, or Firm*—Oblon, Spivak, McClelland, Maier & Neustadt, P.C.

(57) ABSTRACT

A digital speed controlling apparatus includes: a target speed calculator that calculates a target speed of a driven conveyor belt, based on a sampling time; a current speed calculator that calculates a current speed of the conveyor belt, based on displacement and a difference of a sampling time; a target speed determining unit that determines whether a target speed is smaller than a predetermined value; a speed corrector that replaces the current speed with a set value, when the target speed is smaller than the predetermined value and also when the current speed is the minimum unit displacement per the sampling cycle; a speed error calculator that calculates an error between a replaced set value and the target speed; and an automatic controller that controls the drive motor based on a speed error.

24 Claims, 9 Drawing Sheets

DIGITAL SPEED CONTROLLING APPARATUS, DIGITAL MOTOR CONTROLLING APPARATUS, PAPER CONVEYING APPARATUS, DIGITAL SPEED CONTROL METHOD, PROGRAM FOR MAKING COMPUTER EXECUTE THIS METHOD, COMPUTER-READABLE RECORDING MEDIUM, AND IMAGING FORMING APPARATUS

CROSS-REFERENCE TO RELATED APPLICATIONS

The present document incorporates by reference the entire contents of Japanese priority document, 2005-199080 filed in Japan on Jul. 7, 2005.

BACKGROUND OF THE INVENTION

1. Field of the Invention

The present invention relates to a digital speed controlling apparatus, a digital motor controlling apparatus, a paper conveying apparatus, a digital speed control method, a program for making a computer execute this method, a computer-readable recording medium, and an image forming apparatus.

2. Description of the Related Art

In recent years, it is a very important task, from a viewpoint of image quality, to accurately move a paper conveying system by a desired distance and stop the system at this position, in an image forming apparatus such as a copying machine and a printer, particularly, in an image forming apparatus having an inkjet printing mechanism.

There has been developed a technique of decreasing the cost of generating a circuit and facilitating a change in control design, by digital control of software process using a low-cost general-purpose central processing unit (CPU) and a low-cost digital signal processor (DSP) in place of an analog control circuit.

A movement amount of a paper conveyor roller system that conveys recording paper in the above image forming apparatuses can be obtained at a relatively low cost, by obtaining information corresponding to a rotation angle of the conveyor roller, with a rotary encoder fitted to the conveyor roller. The encoder generates pulses with edges disposed in the encoder. While the encoder includes an analog type and a digital type, the digital type encoder can stably obtain rotation angle information with a sensor. Precision of the obtained rotation angle information depends on resolution of the encoder.

FIG. 8 is an explanatory diagram of motor control of a paper conveyor system performed by a conventional digital speed controlling apparatus. In a paper conveyor belt apparatus 7, a drive roller 372 connected to a timing belt 470 from a motor 270 rotates to move a conveyor belt 371. A rotary encoder 571 is set on the drive roller 372.

A sensor 572 detects an output from the rotary encoder 571. A digital speed controlling apparatus 17 outputs a control instruction to the motor 270, based on position information detected by the sensor 572, and applies torque to the motor 270. The control instruction has a different format, such as a current instruction and a voltage instruction, depending on the motor driver.

A control algorithm of this motor control includes a position feedback control performed near a stop position, by performing a speed feedback control up to a position near a target value. According to the position feedback control, a difference between a current position and a target position is multiplied by a predetermined gain to obtain a target speed. By feeding back the speed, a speed difference and a position difference are set to zero simultaneously.

In a conventional image forming apparatus such as an inkjet printer, a high-precision position deviation correction has not been particularly necessary as explained above. Therefore, there are not so many conventional examples of high-precision position deviation correction. Regarding other technical field, a positioning control technique of a servo control method for driving a feed rod of machine tool is proposed in Japanese Patent Application Laid-Open No. 3271440. According to this servo control method for driving a feed rod of machine tool, in order to correct a positioning error due to a backlash, a state switching time is predicted by taking a delay of a position instruction and a position output into consideration, and a servo control is performed by switching an integration time constant.

However, the technique disclosed in Japanese Patent Application Laid-Open No. 3271440 is applied for cutting metal or the like having high hardness in the machine tool and solves a similar problem in a technique assuming occurrence of a huge torque. Therefore, this technique is not suitable to control the behavior of a speed change near a stop position, as a method of correcting a positional deviation of a rotation axis of a general image forming apparatus in which a large torque like metal cutting does not occur.

FIG. 9 is a schematic diagram of one example of speed of a conveyor belt near a stop position according to the conventional digital speed controlling apparatus. After the conveyor belt is controlled to be moved to near the stop position, the conveyor belt is held near the stop position. In this case, the paper conveyor belt system is moving very slowly. As shown in FIG. 9, the conveyor belt is actually moving at a speed obtained by dividing a displacement of, for example, one-eighth pulse by a sampling cycle, at a speed equal to or smaller than a displacement that can be detected as one pulse per one sampling cycle, that is, (positional displacement of one-eighth pulse)/(sampling cycle). However, the controller cannot actually detect this move, unless the conveyer belt passes through a position at which a pulse is generated to change the value of the encoder. This is because the position is displaced by an amount smaller than a minimum unit of positional displacement.

When the pulse is deviated by one pulse from a target position by exceeding the pulse edge of the rotary encoder due to this slow move, the speed is calculated as a speed in a sampling time interval unit from a difference between a position at a current sampling time and position information at the last sampling time, as (positional displacement for one pulse)/(sampling cycle). This value is much larger than that actually obtained from (positional displacement of one-eighth pulse)/(sampling cycle). When the actual speed is slower, that is, when the control is very fine, the error becomes larger.

In other words, near the conveyor belt stop position in the image forming apparatus, when the current speed is obtained by the method of obtaining the speed in the sampling time interval unit from a difference between the position information at the current sampling time and the last position information of the sampling frequency, the obtained speed is substantially different from the actual speed. Therefore, even when the gain is switched according to the speed and the speed is fed back like in the conventional technique disclosed in Japanese Patent Application Laid-Open No. 3271440, this speed control is not valid to control the speed of a displacement equal to or smaller than a displacement (positional deviation) corresponding to one sampling frequency near the stop position.

As a result, when the speed is fed back using the speed detected in the positioning control area, the system is made unstable due to the influence of a speed error, and can even oscillate.

SUMMARY OF THE INVENTION

The present invention has been proposed to cope with the aforementioned problems, and it is an object of the present invention to at least partially solve the problems in the conventional technology.

According to one aspect of the present invention, a closed-loop digital speed controlling apparatus, which makes a sensor detect displacement of a movable body that is moved by digitally controlling a driving unit and controls stop of the movable body, is constructed such that it includes: a displacement detector that obtains displacement of the movable body detected by the sensor, by an integral multiple of minimum unit displacement corresponding to a sampling cycle; a target speed calculator that calculates a target speed of the movable body based on the lapse of a sampling time; a current speed calculator that calculates a current speed of the movable body, based on displacement detected by the displacement detector and a difference of a sampling time for detecting the displacement; a target speed determining unit that determines whether a target speed calculated by the target speed calculator is smaller than a predetermined value; a speed corrector that replaces the current speed with a value set in advance, when the target speed determining unit determines that the target speed is smaller than the predetermined value and also when the current speed calculator calculates that the current speed is the minimum unit displacement per the sampling cycle; a speed error calculator that calculates an error between the set value to which the current speed is replaced by the speed corrector and the target speed; and a controller that controls the driving unit based on a speed error calculated by the speed error calculator.

According to another aspect of the present invention, a closed-loop digital speed controlling apparatus, which makes a sensor detect displacement of a movable body that is moved by digitally controlling a driving unit and controls stop of the movable body, is constructed such that it includes: a displacement detector that obtains displacement of the movable body detected by the sensor, by an integral multiple of minimum unit displacement corresponding to a sampling cycle; a target speed calculator that calculates a target speed of the movable body based on the lapse of a sampling time; a current speed calculator that calculates a current speed of the movable body, based on displacement detected by the displacement detector and a difference of a sampling time for detecting the displacement; a stop state determining unit that determines whether the movable body is in a stop state, based on displacement of the movable body detected by the displacement detector; a speed corrector that replaces the current speed with a value set in advance, when the stop state determining unit determines that the movable body is in a stop state and also when the current speed calculator calculates that the current speed is the minimum unit displacement per the sampling cycle; a speed error calculator that calculates an error between the set value to which the current speed is replaced by the speed corrector and the target speed; and a controller that controls the driving unit based on a speed error calculated by the speed error calculator.

According to still another aspect of the present invention, a closed-loop digital speed controlling apparatus, which makes a sensor detect displacement of a movable body that is moved by digitally controlling a driving unit and controls stop of the movable body, is constructed such that it includes: a displacement detector that obtains displacement of the movable body detected by the sensor, by an integral multiple of minimum unit displacement corresponding to a sampling cycle; a target speed calculator that calculates a target speed of the movable body based on the lapse of a sampling time; a current speed calculator that calculates a current speed of the movable body, based on displacement detected by the displacement detector and a difference of a sampling time for detecting the displacement; a stop control determining unit that determines whether the movable body is in a stop control state for receiving a stop operation control near the stop position, based on displacement of the movable body detected by the displacement detector; a speed corrector that replaces the current speed with a value set in advance, when the stop control determining unit determines that the movable body is in a stop control state and also when the current speed calculator calculates that the current speed is the minimum unit displacement per the sampling cycle; a speed error calculator that calculates an error between the set value to which the current speed is replaced by the speed corrector and the target speed; and a controller that controls the driving unit based on a speed error calculated by the speed error calculator.

According to still another aspect of the present invention, a digital motor controlling apparatus, which makes a sensor detect displacement of a movable body that is moved by digitally controlling a rotation of a motor, and controls stop of the movable body, the digital motor controlling apparatus comprising: a displacement detector that obtains displacement of the movable body detected by the sensor, by an integral multiple of minimum unit displacement corresponding to a sampling cycle; a target speed calculator that calculates a target speed of the movable body based on the lapse of a sampling time; a current speed calculator that calculates a current speed of the movable body, based on displacement detected by the displacement detector and a difference of a sampling time for detecting the displacement; a target speed determining unit that determines whether a target speed calculated by the target speed calculator is smaller than a predetermined value; a speed corrector that replaces the current speed with a value set in advance, when the target speed determining unit determines that the target speed is smaller than the predetermined value and also when the current speed calculator calculates that the current speed is the minimum unit displacement per the sampling cycle; a speed error calculator that calculates an error between the set value to which the current speed is replaced by the speed corrector and the target speed; and a controller that controls the driving unit based on a speed error calculated by the speed error calculator.

According to still another aspect of the present invention, a paper conveying apparatus includes a paper conveying unit that conveys paper based on a rotation of a motor, and a digital motor controlling apparatus, wherein the digital motor controlling apparatus has the above-mentioned construction.

According to still another aspect of the present invention, a method of closed-loop digital speed controlling for detecting a displacement of a movable body that is moved by a driving unit, and controlling stop of the movable body, includes: detecting a displacement of the movable body by an integral multiple of minimum unit displacement corresponding to a sampling cycle; calculating a target speed of the movable body based on the lapse sampling time; calculating a current speed of the movable body, based on the detected displacement and a difference of a sampling time for detecting the displacement; determining a target speed whether the target speed calculated at the calculating of the target speed is smaller than a predetermined value; replacing the current speed with a value set in advance, when the target speed is determined to be smaller than the predetermined value, and also when the current speed is calculated to be the minimum unit displacement with respect to the sampling cycle; calculating an error between the set value to which the current speed is replaced and the target speed; and controlling the driving unit based on a speed error calculated.

According to still another aspect of the present invention, a method of closed-loop digital speed controlling for detecting a displacement of a movable body that is moved by a driving unit, and controlling stop of the movable body, includes: detecting displacement of the movable body by an integral multiple of minimum unit displacement corresponding to a sampling cycle; calculating a target speed of the movable body based on the lapse sampling time; calculating a current speed of the movable body, based on the detected displacement and a difference of a sampling time for detecting the displacement; determining whether the movable body is in a stop state, based on displacement of the movable body detected at the detecting of displacement; replacing the current speed with a value set in advance, when the movable body is in a stop state, and also when the current speed is calculated to be the minimum unit displacement with respect to the sampling cycle; calculating an error between the set value to which the current speed is replaced and the target speed; and controlling the driving unit based on a speed error calculated.

According to still another aspect of the present invention, a method of closed-loop digital speed controlling for detecting a displacement of a movable body that is moved by a driving unit, and controlling stop of the movable body, includes: method of closed-loop digital speed controlling for detecting displacement of a movable body that is moved by a driving unit, and controlling stop of the movable body, said method comprising: detecting displacement of the movable body by an integral multiple of minimum unit displacement corresponding to a sampling cycle; calculating a target speed of the movable body based on the lapse sampling time; calculating a current speed of the movable body, based on the detected displacement and a difference of a sampling time for detecting the displacement; determining whether the movable body is in a stop control state for receiving a stop operation control near the stop position, based on displacement of the movable body detected at the detecting of displacement; replacing the current speed with a value set in advance, when the target speed is determined to be in a stop control state, and also when the current speed is calculated to be the minimum unit displacement with respect to the sampling cycle; calculating an error between the set value to which the current speed is replaced and the target speed; and controlling the driving unit based on a speed error calculated at the calculating of an error.

According to still another aspect of the present invention, a computer-readable recording medium that stores a program for making a computer execute either one of the above-mentioned methods of closed-loop digital speed controlling, wherein the methods includes the above-mentioned steps.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of a digital speed controlling apparatus, a digital motor controlling apparatus, a paper conveying apparatus, a digital speed control method, a program for making a computer execute this method, a computer-readable recording medium, and an image forming apparatus according to the present invention will be explained in detail below with reference to the accompanying drawings. The embodiments are explained according to first to third embodiments, and first to sixth modifications.

A paper conveying apparatus according to the first embodiment is applied to a controlling apparatus of a sub-scan system that moves a conveyor belt by a predetermined distance in an inkjet system image forming apparatus. However, the application of the present invention is not limited to only the controlling apparatus of a sub-scan system.

Figure 1:
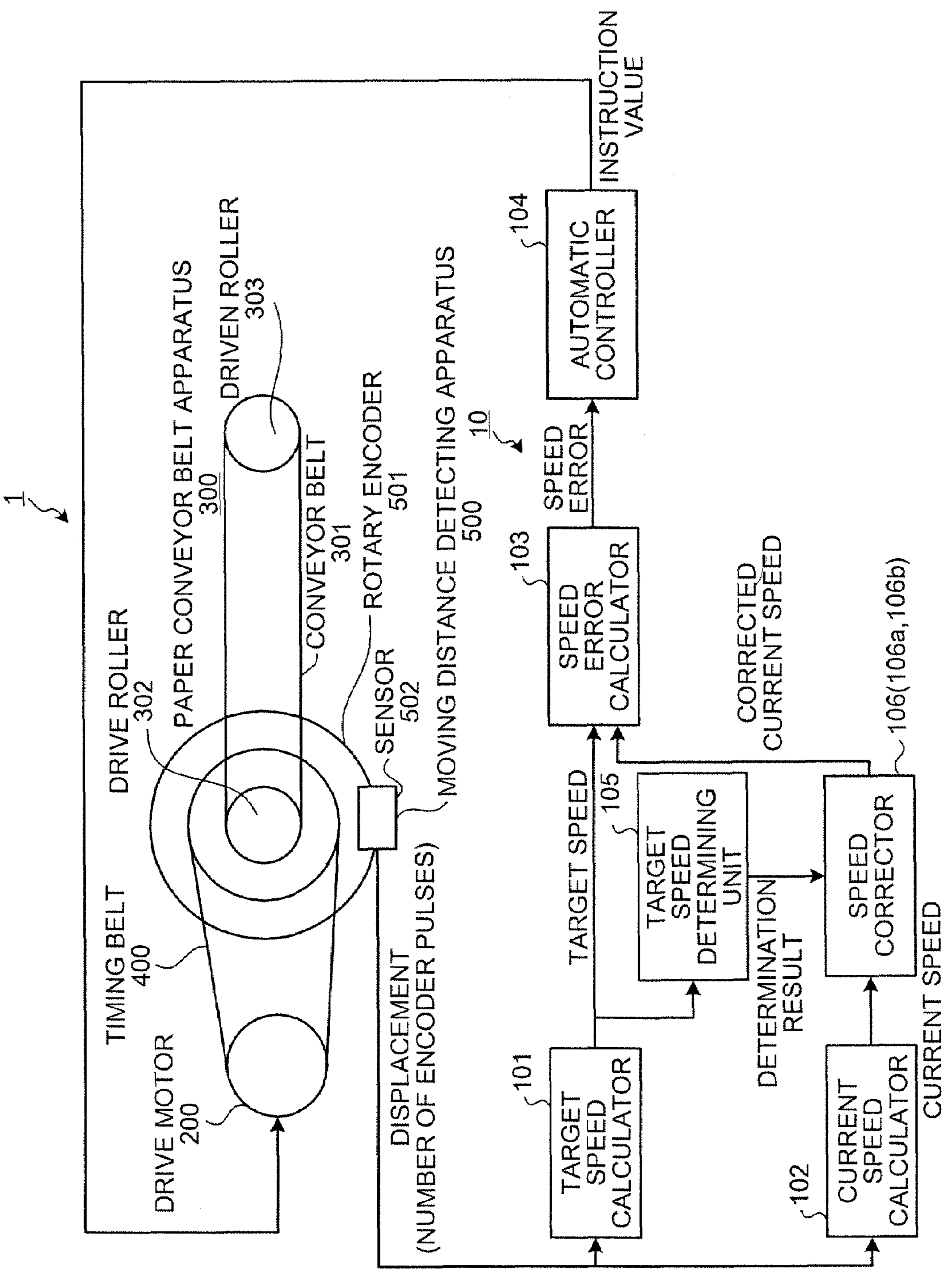
FIG. 1 is a functional block diagram of a paper conveying apparatus according to a first embodiment of the present invention.

FIG. 1 is a functional block diagram of the paper conveying apparatus according to the first embodiment. A paper conveying apparatus 1 according to the first embodiment includes a digital speed controlling apparatus 10, a paper conveyor belt apparatus 300, and a moving distance detecting apparatus 500.

The paper conveyor belt apparatus 300 has a drive motor 200, a conveyor belt 301, a drive roller 302, a driven roller 303, and a timing belt 400. The drive motor 200 drives the drive roller 302, and moves the conveyor belt 301 supported by the drive roller 302 and the driven roller 303. The drive motor 200 and the drive roller 302 are connected together via the timing belt 400. A direct current motor can be used for the drive motor 200.

The moving distance detecting apparatus 500 has a rotary encoder 501 and a sensor 502. The moving distance detecting apparatus 500 detects a current moving state of the conveyor belt 301 of the paper conveyor belt apparatus 300 as a displacement. In this case, the moving distance detecting apparatus 500 performs a digital speed control. Therefore, displacement can be obtained in only an integer times a predetermined minimum unit.

A digital rotary encoder fitted to the drive motor 200, or the rotary encoder 501 fitted to the drive roller 302, or a linear encoder fitted to the surface of the conveyor belt 301 can be used to detect a movement amount of the conveyor belt 301. In the present embodiment, the rotary encoder 501 is mounted on the drive roller 302. However, the movement amount detection method is not limited to this. The rotary encoder 501 outputs a displacement in an integral value of an encoder pulse unit.

The digital speed controlling apparatus 10 has a target speed calculator 101, a current speed calculator 102, a speed error calculator 103, an automatic controller 104, a target speed determining unit 105, and a speed corrector 106.

The target speed calculator 101 inputs a moving distance from the moving distance detecting apparatus 500, calculates a target speed, based on a target speed calculation algorithm, described later, and the input moving distance information, and outputs the calculated target speed to the automatic controller 104 and the target speed determining unit 105.

Figure 2:
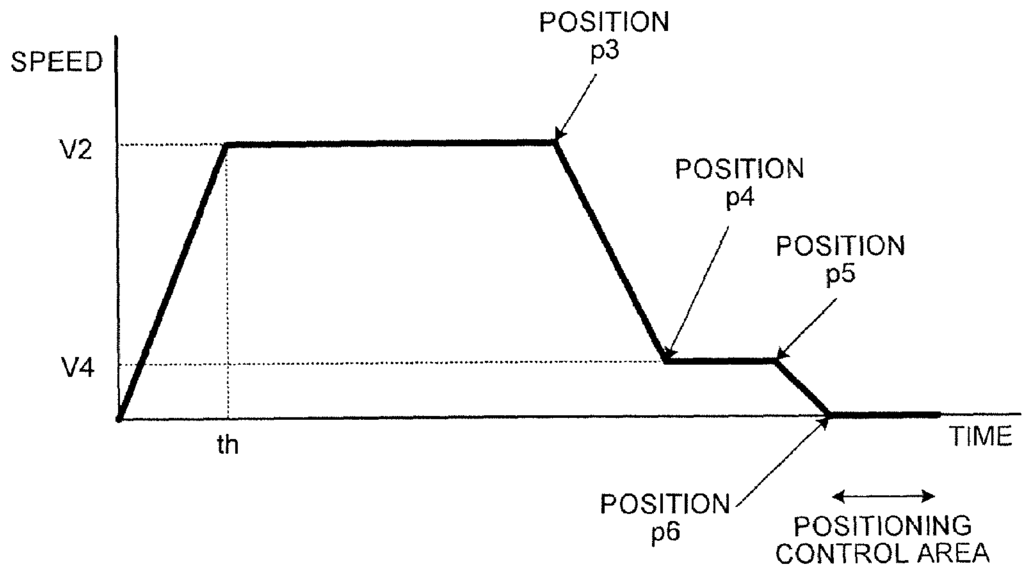
FIG. 2 is a schematic diagram of one example of a target speed calculation algorithm used by a target speed calculator.

FIG. 2 is a schematic diagram of one example of a target speed calculation algorithm used by the target speed calculator 101. The target speed calculator 101 calculates a target speed at each time, using a control starting time as a basis, a current belt moving amount (displacement) of the conveyor belt 301, and a current speed of the conveyor belt 301.

The current speed calculator 102 inputs a moving distance from the moving distance detecting apparatus 500, calculates a current speed based on the input moving distance, and outputs the calculated current speed to the speed corrector 106.

The target speed determining unit 105 inputs a target speed from the target speed calculator 101, and determines whether the input target speed is smaller than a predetermined value. When the target speed is smaller than the predetermined value, the target speed determining unit 105 determines that the area is a positioning control area (an area at and after the time indicated by p6 in FIG. 2) for receiving the control of stop operation, near the stop position. The speed here is a speed of displacement of four pulses to ten pulses, for example. The conveyor belt 301 is brought to the positioning control area, and fine positioning control is performed thereafter. The target speed determining unit 105 outputs a result of the determination to the speed corrector 106.

The speed corrector 106 receives the result of the determination from the target speed determining unit 105, receives the current speed from the current speed calculator 102, and determines whether the current speed is equal to or smaller than one pulse. When the current speed is one pulse, the speed corrector 106 forcibly replaces the speed with zero, and outputs the corrected speed zero to the speed error calculator 103. The operation performed by the speed corrector 106 is described later.

The speed error calculator 103 receives the target speed from the target speed calculator 101, receives the corrected speed from the speed corrector 106, calculates a speed error as a difference between the corrected speed and the target speed, and outputs the calculated speed error to the automatic controller 104.

The automatic controller 104 receives the speed error that is output from the speed error calculator 103, calculates a motor driving output, and outputs the motor driving output to the drive motor 200. Thus, the automatic controller 104 controls the driving of the drive motor 200.

The digital speed controlling apparatus 10, excluding the target speed determining unit 105 and the speed corrector 106, constitutes a general closed-loop speed controlling apparatus, as is well known to those skilled in the art.

Parts that constitute the digital speed controlling apparatus 10 can be formed by programming to a general-purpose computer or a general-purpose digital signal processor (DSP).

Paper conveyance operation performed by the digital speed controlling apparatus 10 is explained next. In the target speed generation algorithm shown in FIG. 2, paper conveyance speed is accelerated at a constant acceleration rate during a period from a control starting time till a predetermined time th. When the conveyance speed reaches a predetermined speed v2 at the time th, the speed is switched to this constant speed v2. Thereafter, when the paper reaches a position where the displacement corresponds to a predetermined amount p3, a target speed becomes a deceleration speed expressed by the function of displacement. When the current speed reaches v4, the conveyance speed becomes constant again. When the displacement reaches a predetermined amount p5, a target speed becomes a deceleration speed expressed by the function of displacement. When the displacement reaches p6, the area becomes a positioning control area, and the automatic controller 104 controls a position control mode. In the position control mode, a predetermined gain is multiplied to a difference between the target position and the current position, thereby obtaining a target speed. The speed is controlled based on this target speed.

The current speed calculator 102 calculates a difference between displacements at adjacent sampling times that are output from the moving distance detecting apparatus 500, and obtains the current speed from this difference. In other words, when Δx denotes a difference between displacements, and when Δt denotes a difference between sampling times, the current speed can be obtained from the following expression 1.

$$V=\Delta x/\Delta t \qquad \text{Expression 1}$$

The difference between sampling times can be one pulse or plural pulses, as long as a difference between corresponding displacements is obtained.

The target speed determining unit 105 determines whether a mode is the position control mode when the absolute value of an input target speed is equal to or below a predetermined threshold value. In other words, after passing the predetermined position p5, the target speed determining unit 105 determines whether the paper conveyance position is in the positioning control area for accurately controlling the positioning of the conveyor belt 301 near the stop position.

Assume that displacement corresponding to the number of pulses n is expressed as p(n). When a threshold value is a movement amount for one pulse, the threshold value can be expressed as p(4) for four pulses for example.

Therefore, the target speed determining unit 105 determines whether the following expression 2 is satisfied, and inputs a result of the determination to the speed corrector 106.

$$|v| \leqq p(4)/|\Delta t| \quad \text{Expression 2}$$

When a result of the determination input from the target speed determining unit 105 is other than the positioning control area, that is, when the target speed is not smaller than a predetermined threshold value, the speed corrector 106 outputs the current speed received from the current speed calculator 102 as it is, and straightly approaches the positioning area. On the other hand, when the target speed is equal to or smaller than a predetermined threshold value, the conveyor belt is already in the positioning control area. Therefore, the speed corrector 106 performs a fine control. The current speed that is detected and corrected accurately is replaced by a predetermined set value, such as zero, and this replaced value is output to the speed error calculator 103. In the positioning control area, the speed corrector 106 finely controls and accurately detects the speed, and forcibly replaces the target speed with a set value, such as zero, thereby obtaining stable control by suppressing divergence.

Figure 3:
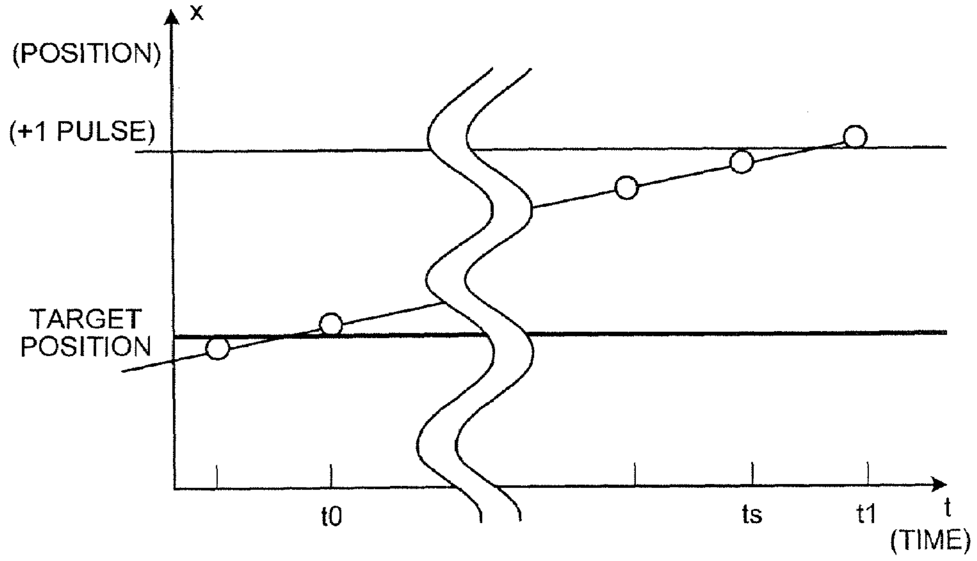
FIG. 3 is an explanatory diagram of a relationship between displacement of a conveyor belt and time in a positioning control area.

FIG. 3 is an explanatory diagram of a relationship between displacement of a conveyor belt and time in a positioning control area. The positioning control area is the area after the conveyor belt 301 is moved to the position p6 shown in FIG. 2.

Although the position of the conveyor belt 301 exceeds the target position at time t0, it is not detected such that it has exceeded one pulse. Displacement of the position by one pulse is detected for the first time when the time reaches t1 (t0<t1) in FIG. 3. Therefore, when the speed is calculated as a time difference between the time t1 and ts which is one sampling cycle before, by detecting displacement for one pulse at t1, like in the conventional example, that is, (displacement for one pulse)/(one sampling cycle) at t1, a speed quite different from the actual speed of the conveyor belt 301 is calculated. Therefore, while the speed approaches convergence, the problem that the speed is divergent in the positioning control area cannot be solved.

In the digital speed controlling apparatus 10 according to the first embodiment, the speed corrector 106 forcibly replaces the speed with a predetermined value, for example, zero, thereby accurately converging the speed following the actual operation, and preventing divergence.

The speed error calculator 103 calculates a difference between the target speed calculated by the target speed calculator 101 and a corrected current speed received from the speed corrector 106, thereby calculating a speed error, and outputs the speed error to the automatic controller 104. For the convenience of explanation, the corrected current speed includes also a case of the current speed calculated by the current speed calculator 102 which is equal to or above a predetermined threshold value determined by the target speed determining unit 105.

The automatic controller 104 calculates a motor output using a predetermined automatic controller calculation following the input speed error, and controls the driving of the drive motor 200 based on the calculated motor output. The automatic controller 104 performs a P control, a proportional integral (PI) control, a proportional integral derivative (PID) control, and a state feedback control. While a stable control result is obtained by the PI control among the controls, the control is not limited to the PI control.

Figure 4:
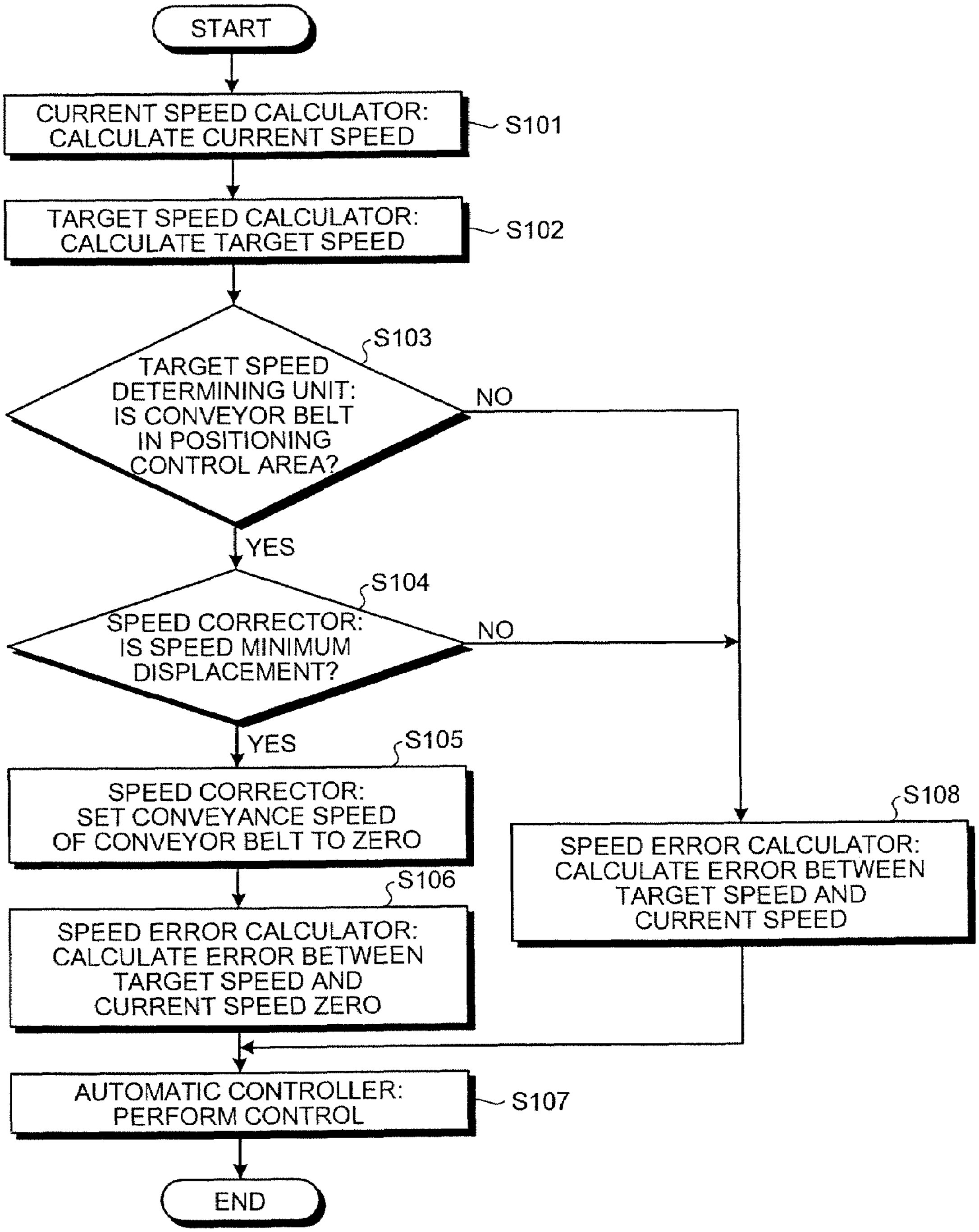
FIG. 4 is a flowchart for explaining a speed control procedure according to the first embodiment.

FIG. 4 is a flowchart for explaining a speed control procedure according to the first embodiment. The current speed calculator 102 calculates a current speed at which the conveyor belt 301 is moving, using an encoder pulse detected by the sensor 502 (step S101). The target speed calculator 101 calculates a target speed of the conveyor belt 301, using elapsed time as a function, according to the algorithm shown in FIG. 2 (step S102).

The target speed determining unit 105 determines whether the target speed calculated at step S102 is smaller than a threshold value. The threshold value is, for example, (displacement of four pulses)/(sampling cycle). The target speed determining unit 105 determines whether the conveyor belt 301 is in the positioning control area, by determining the target speed in comparison with the threshold value (step S103). In other words, in the present embodiment, the target speed determining unit 105 determines whether the conveyor belt 301 is in the positioning control area, based on whether the target speed is smaller than the predetermined value.

When the target speed determining unit 105 determines that the target speed is smaller than the threshold value (step S103: Yes), it is determined that the conveyor belt 301 is in the positioning control area. In the positioning control area, the speed of the conveyor belt 301 needs to be decreased toward the convergence of the operation.

The speed corrector 106 determines whether the speed of the conveyor belt 301 in a quasi-stop state is equal to or smaller than one pulse (step S104). When the speed corrector 106 determines that the speed of the conveyor belt 301 is equal to the speed for one pulse (step S104: Yes), the speed corrector 106 forcibly sets the conveyance speed of the conveyor belt 301 to a predetermined set value, such as zero, and outputs this speed to the speed error calculator 103 (step S105).

The speed error calculator 103 calculates a speed error between the received target speed zero and the current speed calculated by the current speed calculator 102, and output the speed error to the automatic controller 104 (step S106). The automatic controller 104 performs automatic control based on the received speed error, thereby controlling the rotation of the drive motor 200.

On the other hand, when the target speed determining unit 105 determines that the conveyor belt 301 is not in the positioning control area based on the determination of the threshold value (step S103: No), the speed error calculator 103 calculates an error between the target speed and the current speed, and outputs the error to the automatic controller 104 (step S108). The automatic controller 104 performs the control following the received speed error (step S107).

When the speed corrector 106 determines that the speed of the conveyor belt 301 is larger than the threshold value based on the determination of the threshold value, that is, the speed of the conveyor belt 301 is equal to or larger than two pulses (step S104: No), the speed error calculator 103 calculates the error between the target speed and the current speed, and outputs the calculated error to the automatic controller 104 (step S108). The automatic controller 104 performs the control following the received speed error (step S107).

As explained above, in the position control, when the displacement of the conveyor belt 301 corresponds to one pulse, the digital speed controlling apparatus 10 forcibly replaces the current speed of the conveyor belt 301 with zero, in the positioning control area near the stop position. With this arrangement, the measurement error of the current speed is decreased, and the divergence of the positioning near the stop position is suppressed, thereby stabilizing the positioning control.

The paper conveying apparatus 1 according to a first modification of the first embodiment is different from the paper conveying apparatus according to the first embodiment in that a speed corrector 106*a* (the same position as that of the reference numeral 106 in FIG. 1) of the digital speed controlling apparatus 10 is different. Configurations and operations of other elements are the same as those according to the first embodiment. Therefore, their explanation is omitted or simplified, and mainly different points are explained below.

When the input determination result is smaller than a predetermined threshold value, the speed corrector 106*a* calculates the following speed correction value, and outputs a result of the calculation to the speed error calculator 103. In this example, the speed corrector 106*a* has a memory (not shown), and always stores time when the speed changes to a different target speed immediately before the current target speed. In the example shown in FIG. 3, when the current target speed is detected as t1 by detecting a pulse expressing the position, the time when the speed changes to the target speed immediately before is t0. Thereafter, one pulse is displaced at the current time (time t1).

A correction speed is determined as follows.

$$p(1)/(t1-t0) \quad \text{Expression 3}$$

where p(1) denotes displacement for one pulse, that is, a minimum displacement of this apparatus.

A difference is explained following the speed control procedure. At step S105 shown in FIG. 4, the speed corrector 106*a* forcibly replaces the target speed with the speed obtained from the above expression, and outputs this speed to the speed error calculator 103. At step S106, the speed error calculator 103 calculates a speed error between the target speed calculated by the above expression output from the speed corrector 106*a* and the current speed.

As explained above, in the position control, when the displacement is for one pulse, that is, when the displacement is a minimum unit displacement, the digital speed controlling apparatus 10 according to the first modification corrects the current speed to (displacement for one pulse)/(t1−t0). Therefore, the digital speed controlling apparatus 10 controls the speed, using the current speed having a small measurement error. Consequently, a measurement error of the current speed can be reduced, and divergence near the stop position can be suppressed, thereby stabilizing the positioning control.

The paper conveying apparatus 1 according to a second modification of the first embodiment is different from the paper conveying apparatus of the first embodiment in that a speed corrector 106*b* of the digital speed controlling apparatus 10 is different. In this second modification, the speed corrector 106*b* is disposed at the position of the speed corrector 106 according to the first embodiment. Configurations and operations of other elements are the same as those according to the first embodiment. Therefore, their explanation is omitted or simplified, and mainly different points are explained below.

In the second modification, the speed corrector 106*b* has a memory (not shown), and always stores displacement of the past predetermined number of sampling. The speed corrector 106*b* estimates the current target speed from the past displacement and the current displacement. The algorithm of prediction includes linear prediction and moving-average prediction.

When the determination result that is input from the target speed determining unit 105 is that the speed of the conveyor belt 301 is a minimum displacement of pulse, the speed corrector 106*b* outputs a corrected target speed that is predicted by the speed corrector 106*b*.

A difference of the speed control procedure is explained as follows. At step S105 shown in FIG. 4, the speed corrector 106*b* calculates a prediction value, and when the speed is a minimum unit speed, the speed corrector 106*b* forcibly replaces the target speed with the calculated prediction value, and outputs the prediction value. At step S106, the speed error calculator 103 calculates a speed error between the prediction value obtained by replacement by the speed corrector 106*b* and the current speed.

As explained above, in the position control, when the displacement corresponds to one pulse, the digital speed controlling apparatus according to the second modification replaces the current speed with the prediction value, thereby correcting the speed. Therefore, the digital speed controlling apparatus controls the speed using the current speed having a small measurement error. As a result, a measurement error of the current speed can be reduced, and divergence can be suppressed near the stop position, thereby stabilizing the positioning control.

Figure 5A:
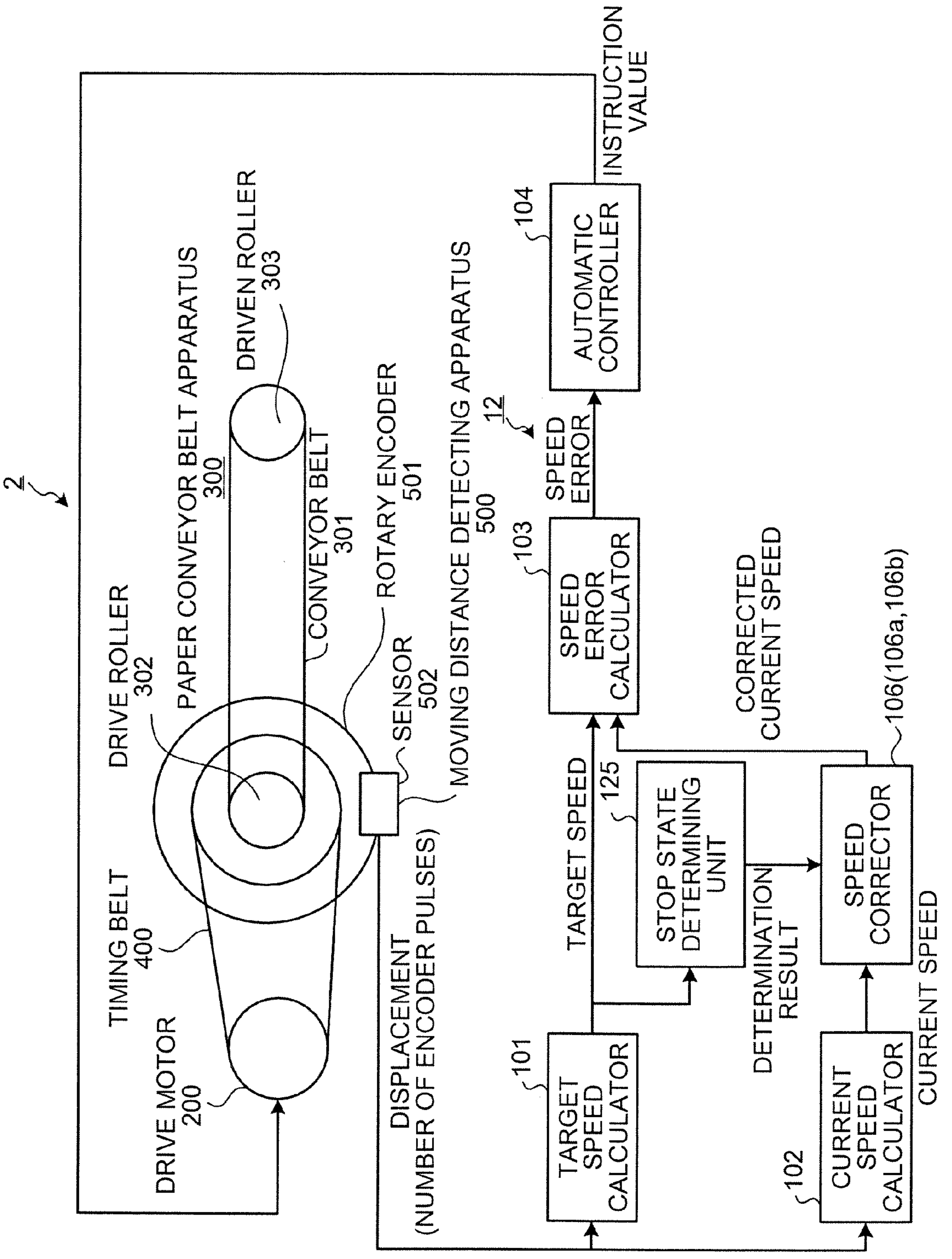
FIG. 5A is a functional block diagram of a paper conveying apparatus according to a second embodiment of the present invention.

FIG. 5A is a functional block diagram of a paper conveying apparatus according to the second embodiment. A digital speed controlling apparatus 12 according to the second embodiment is different from the digital speed controlling apparatus of the first embodiment in that a stop state determining unit 125 is provided in place of the target speed determining unit 105.

The stop state determining unit 125 inputs the number of encoder pulses as the output of the moving distance detecting apparatus 500, as displacement, determines whether the conveyor belt 301 is in the positioning control area (the area after the position p6 in FIG. 2), and outputs a result of the determination to the speed corrector 106. The stop state is a state of temporarily turning off the drive motor 200 after the conveyor belt 301 enters the positioning control area by approaching the stop position. Even when the drive motor 200 is turned off temporarily, displacement of the drive motor 200 occurs due to inertia. When the encoder exceeds the minimum unit pulse edge, the sensor 502 detects the displacement. In this case, the positioning control area is within the range of displacement of four to ten pulses from the stop position, for example.

In a case in which the conveyor belt 301 keeps a predetermined state of displacement during a predetermined period, the stop state determining unit 125 can determine that the conveyor belt 301 is in the positioning control area. When the displacement according to the number of encoder pulses of the sensor 502 is kept at substantially the position p6 for a certain period of time, the stop state determining unit 125 determines that the conveyor belt 301 is in the positioning control area. As shown in FIG. 2, the target speed is kept at substantially a constant value in three areas, namely the area up to the position p3 after th, the area from the position p4 to p5, and the area after the position p6.

When the input determination result is that the conveyor belt 301 is in an area other than the positioning control area, when the current speed calculated by the current speed calculator 102 corresponds to a minimum pulse, the speed corrector 106 forcibly corrects the speed to a set correction value such as zero, and outputs this value to the speed error calculator 103. When the current speed calculated by the current speed calculator 102 does not correspond to a minimum pulse, the speed corrector 106 outputs the speed as it is to the speed error calculator 103.

Figure 5B:
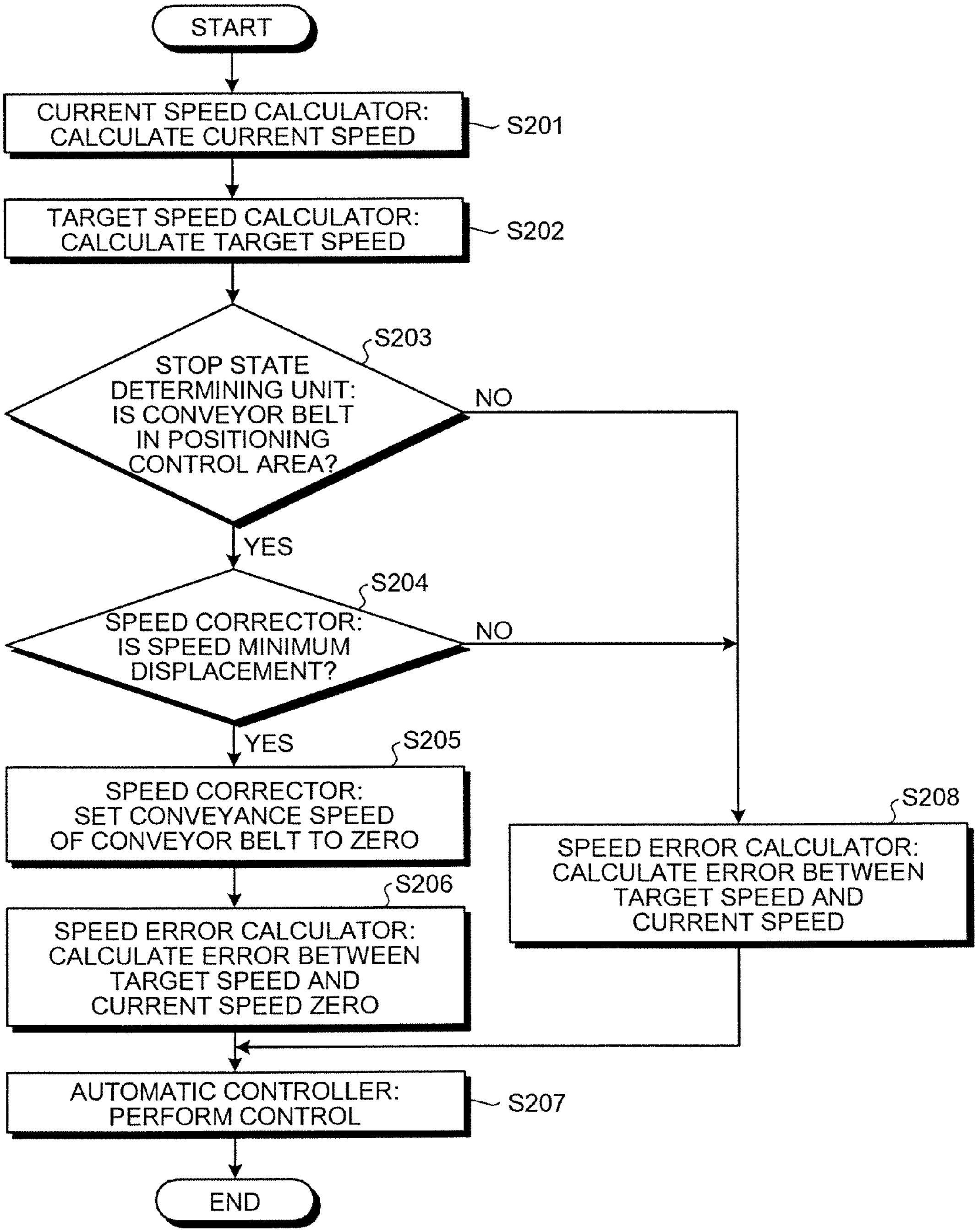
FIG. 5B is a flowchart for explaining a speed control procedure according to the second embodiment.

FIG. 5B is a flowchart for explaining a speed control procedure according to the second embodiment. Only step S203 of this speed control procedure is different from step S103 of the procedure in the first embodiment. Therefore, only step S203 is mainly explained, and explanation of other steps is simplified or omitted.

The stop state determining unit 125 determines whether the conveyor belt 301 is in the positioning control area, based on a moving distance detected by the moving distance detecting apparatus 500. It is assumed that the threshold value is displacement of, for example, four to ten pulses. The stop state determining unit 125 determines whether the conveyor belt 301 is in the positioning control area, by comparing the displacement with the threshold value (step S203). In other words, the stop state determining unit 125 determines whether the conveyor belt 301 is in the positioning control area, depending on whether the displacement is smaller than the predetermined value.

When the stop state determining unit 125 determines that the displacement is smaller than the predetermined value (S203: Yes), the stop state determining unit 125 determines that the conveyor belt 301 is in the positioning control area, and stops the drive motor 200. In the positioning control area, the operation of the conveyor belt 301 is directed toward convergence, and the speed needs to be further decreased.

The speed corrector 106 determines whether the speed of the conveyor belt 301 in a quasi-stop state is equal to or smaller than one pulse (step S204). The subsequent operations are the same as those in the first embodiment, and therefore, their explanation is omitted. Even when the determination result at step S203 is No, the subsequent operations are the same as those in the first embodiment, and therefore, their explanation is omitted.

As explained above, the digital speed controlling apparatus 12 according to the second embodiment determines whether the conveyor belt 301 is in the positioning control area, based on displacement. When the conveyor belt 301 is in the positioning control area, the digital speed controlling apparatus 12 forcibly replaces the current speed with zero, and outputs zero to make small the measurement error of the current speed, thereby stabilizing the positioning control.

When the speed is relatively slow, the digital speed controlling apparatus 12 according to the second embodiment sets the speed to the stop state, and corrects the current speed to, for example, zero. Since the speed can be controlled using the current speed with a small measurement error, the control can be stabilized.

A paper conveying apparatus 2 according to the third modification, which is now explained hereinafter is different from that of the second embodiment in that the speed corrector 106*a* (at the same position as that of the reference numeral 106 in FIG. 5A) of the digital speed controlling apparatus 12 is different. Configurations and operations of other elements are the same as those of the second embodiment. Therefore, their explanation is omitted or simplified, and mainly different points are explained below.

When the stop state determining unit 125 determines that the conveyor belt 301 is in the stop state, and also when the stop state determining unit 125 determines that the current speed is a minimum pulse, the speed corrector 106*a* calculates the following speed correction value and outputs the calculated result to the speed error calculator 103. In this example, the speed corrector 106*a* has a memory (not shown), and always stores time when the speed changes to a different target speed immediately before the current target speed. In the example shown in FIG. 3, when t1 is detected by detecting a pulse expressing the current target speed, the time when the speed changes to the target speed immediately before is t0. Thereafter, one pulse is displaced at the current time (time t1). A correction speed is determined as follows.

$$p(1)/(t1-t0) \qquad \text{Expression 4}$$

where p(1) denotes displacement for one pulse, that is, a minimum displacement of this apparatus.

A difference is explained following the control procedure. At step S205 shown in FIG. 5B, the speed corrector 106*a* forcibly replaces the target speed with the speed obtained from the above expression, and outputs this speed to the speed error calculator 103. At step S206, the speed error calculator 103 calculates a speed error between the target speed calculated by the above expression output from the speed corrector 106*a* and the current speed.

As explained above, in the position control, when the displacement is one pulse, that is, when the displacement is a minimum unit displacement, the digital speed controlling apparatus 12 according to the third modification corrects the current speed to (displacement for one pulse)/(t1−t0). Therefore, the digital speed controlling apparatus 12 controls the speed, using the current speed having a small measurement error. Consequently, a measurement error of the current speed can be reduced, and divergence near the stop position can be suppressed, thereby stabilizing the positioning control.

The paper conveying apparatus 2 according to a fourth modification, which is now explained hereinafter is different from the paper conveying apparatus according to the second embodiment in that the speed corrector 106 of the digital speed controlling apparatus 12 is different. In this fourth modification, the speed corrector 106*b* is disposed at the position of the speed corrector 106 according to the second embodiment. Configurations and operations of other elements are the same as those according to the second embodiment. Therefore, their explanation is omitted or simplified, and mainly different points are explained below.

In the fourth modification, the speed corrector 106*b* has a memory (not shown), and always stores displacement of the past predetermined number of sampling. The speed corrector 106*b* estimates the current target speed from the past displacement and the current displacement. The algorithm of prediction includes linear prediction and moving-average prediction.

When the determination result input from the stop state determining unit 125 is that the conveyor belt 301 is in the stop state, the speed corrector 106*b* outputs a corrected target speed that is predicted and calculated by the speed corrector 106*b*.

A difference of the speed control procedure is explained. As follows At step S205 shown in FIG. 5B, the speed corrector 106*b* calculates a prediction value, and forcibly replaces the target speed with the calculated prediction value, and outputs the prediction value. At step S206, the speed error calculator 103 calculates a speed error between the prediction value obtained by replacement by the speed corrector 106*b* and the current speed.

As explained above, in the position control, when the displacement corresponds to one pulse, the digital speed controlling apparatus 12 according to the fourth modification corrects the current speed by calculating a prediction value. Therefore, the speed can be controlled using the current speed having a small measurement error. With this arrangement, the digital speed controlling apparatus 12 can minimize the measurement error of the current speed, suppress divergence near the stop position, and stabilize positioning control.

Figure 6A:
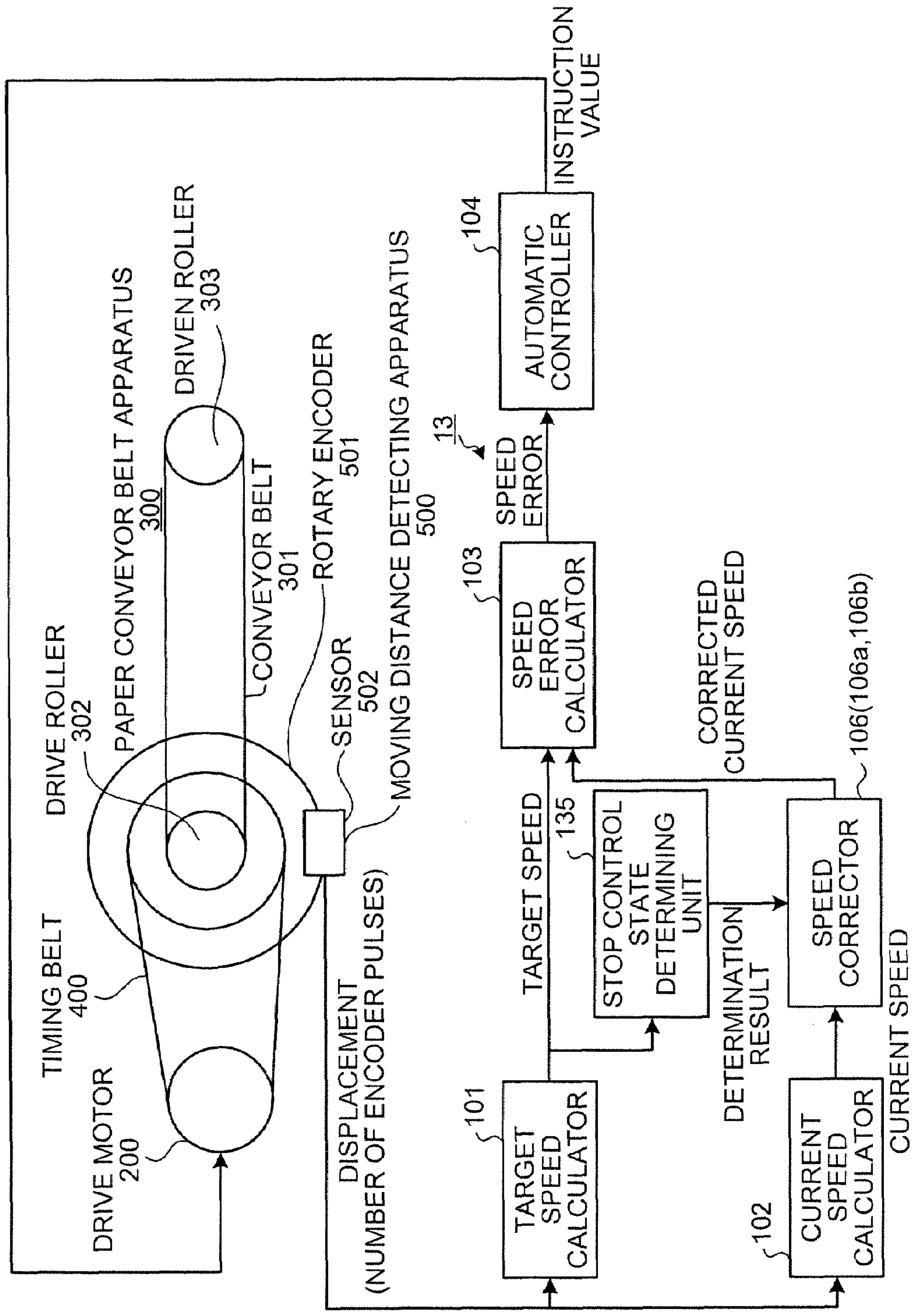
FIG. 6A is a functional block diagram of a paper conveying apparatus according to a third embodiment of the present invention.

FIG. 6A is a functional block diagram of a paper conveying apparatus according to the third embodiment. A digital speed controlling apparatus 13 according to the third embodiment is different from the digital speed controlling apparatus according to the first embodiment in that the digital speed controlling apparatus 13 has a stop control state determining unit 135. The function of the speed corrector 106 is also different from that according to the first embodiment.

The stop control state determining unit 135 inputs the number of encoder pulses as the output of the moving distance detecting apparatus 500, as displacement, and the digital speed controlling apparatus 13 determines whether the conveyor belt 301 is in a stop control state. The stop control state is a state that the conveyor belt 301 is being controlled to move to the stop position near the stop position, and the control state is maintained without disconnecting the drive motor 200.

The stop control state determining unit 135 outputs a result of the determination to the speed corrector 106. The stop control state determining unit 135 determines that the digital speed controlling apparatus 13 is in the stop control state when a difference between the controlled displacement and the stop target displacement is within a predetermined range.

Upon determining that the conveyor belt 301 is not in the stop control state, the stop control state determining unit 135 outputs the current speed to the speed error calculator 103. When the stop control state determining unit 135 determines that the conveyor belt 301 is in the stop control state, the speed corrector 106 determines whether the current speed is minimum displacement. When the current speed is minimum displacement, the speed corrector 106 outputs the set current speed, for example, a speed zero.

Figure 6B:
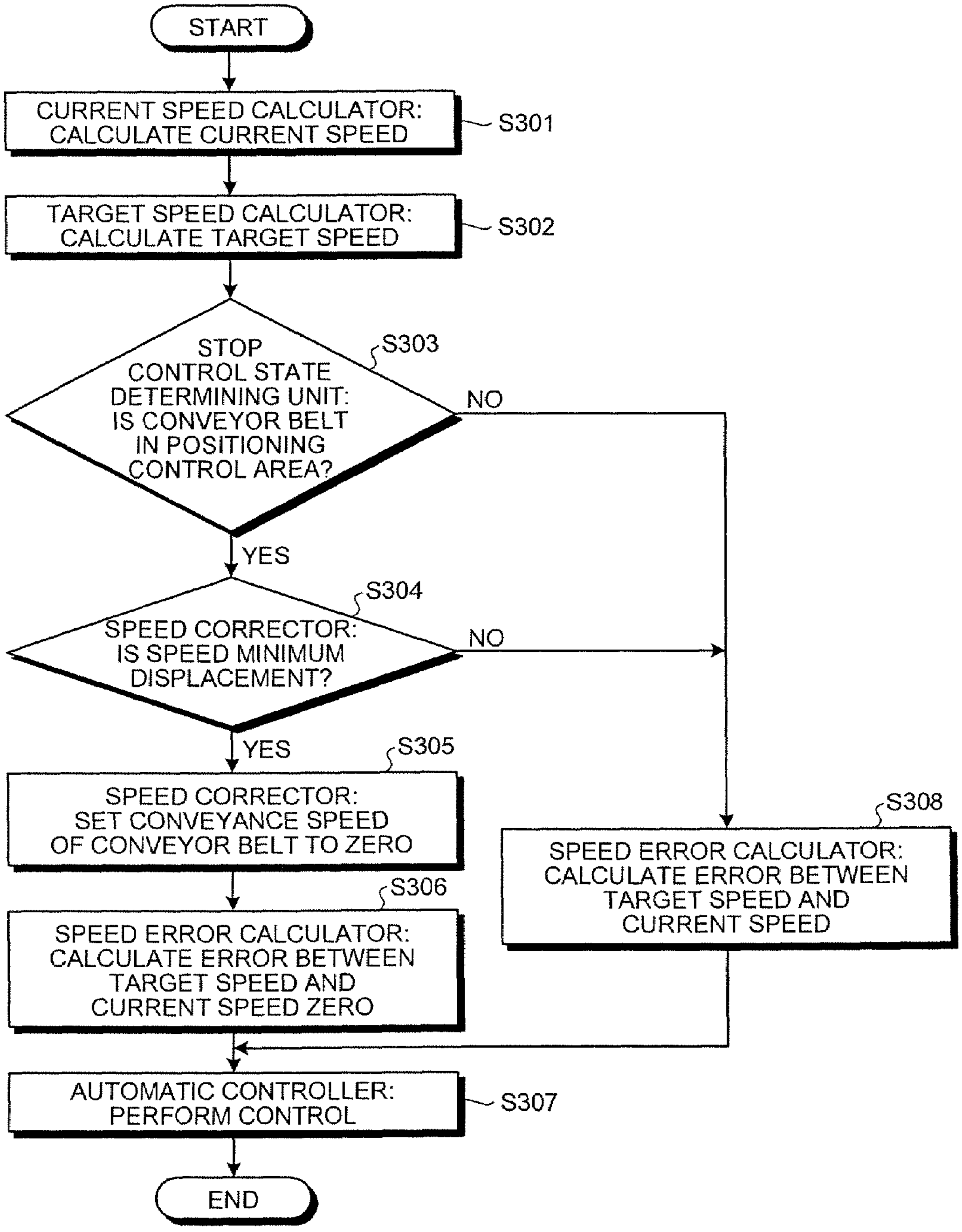
FIG. 6B is a flowchart for explaining a speed control procedure according to the third embodiment.

FIG. 6B is a flowchart for explaining a speed control procedure according to the third embodiment. Only step S303 of this speed control procedure is different from step S103 of the procedure in the first embodiment. Therefore, only step S303 is mainly explained, and explanation of other steps is simplified or omitted.

The stop control state determining unit 135 determines whether the conveyor belt 301 is in the positioning control area, based on a moving distance detected by the moving distance detecting apparatus 500. It is assumed that the threshold value is displacement of four to ten pulses. When the conveyor belt 301 is within this range, the stop control state determining unit 135 determines that the conveyor belt 301 is in the positioning control area and is in the state of receiving the stop control. In other words, the third embodiment is different from the second embodiment in that the stop control operation is performed without disconnecting the drive motor 200. The stop control state determining unit 135 determines whether the conveyor belt 301 is in the positioning control area, by comparing the size of the displacement with the threshold value (step S303). In other words, according to the third embodiment, the stop control state determining unit 135 determines whether the conveyor belt 301 is in the positioning control area, by determining whether the displacement is within a predetermined range.

When the stop control state determining unit 135 determines that the displacement is within a predetermined range (step S303: Yes), it means that the stop control state determining unit 135 has determined that the conveyor belt 301 is in the positioning control area, and thus sets the drive motor 200 to a state of receiving the stop control. In the positioning control area, the operation of the conveyor belt 301 is directed toward convergence, and the speed needs to be further decreased.

The speed corrector 106 determines whether the speed of the conveyor belt 301 in a quasi-stop state is equal to or smaller than one pulse (step S304). The subsequent operations are the same as those in the first embodiment, and therefore, their explanation is omitted. Even when the determination result at step S303 is No, the subsequent operations are the same as those in the first embodiment, and therefore, their explanation is omitted.

As explained above, in the stop control state of a relatively slow speed, the digital speed controlling apparatus 13 according to the third embodiment sets the current speed to a predetermined set value, or forcibly replaces the current speed with the speed zero, for example. With this arrangement, the measurement error of the current speed can be minimized, thereby stabilizing the positioning control at the stop position.

A paper conveying apparatus 3 according to a fifth modification is different from that of the third embodiment in that the speed corrector 106*a* (at the same position as that of the reference numeral 106 in FIG. 6A) of the digital speed controlling apparatus 13 is different. Configurations and operations of other elements are the same as those according to the third embodiment. Therefore, their explanation is omitted or simplified, and mainly different points are explained below.

When the input determination result is smaller than a predetermined range, the stop corrector 106*a* calculates the following speed correction value, and outputs the speed correction value to the speed error calculator 103. In this example, the speed corrector 106*a* has a memory (not shown), and always stores time when the speed changes to a different target speed immediately before the current target speed. In the example shown in FIG. 3, when the current target speed is detected as t1 by detecting a pulse expressing the position, the time when the speed changes to the target speed immediately before is t0. Thereafter, one pulse is displaced at the current time (time t1). A correction speed is determined as follows.

$$p(1)/(t1-t0) \qquad \text{Expression 5}$$

where p(1) denotes displacement for one pulse, that is, a minimum displacement of this apparatus.

A difference is explained following the speed control procedure. At step S305 shown in FIG. 6B, the speed corrector 106*a* forcibly replaces the target speed with the speed obtained from the above expression, and outputs this speed to the speed error calculator 103. At step S306, the speed error calculator 103 calculates a speed error between the target speed calculated by the above expression output from the speed corrector 106*a* and the current speed.

As explained above, in the position control, when the displacement is for one pulse, that is, when the displacement is a minimum unit displacement, the digital speed controlling apparatus 13 according to the fifth modification corrects the current speed to (displacement for one pulse)/(t1–t0). Therefore, the digital speed controlling apparatus 13 controls the speed, using the current speed having a small measurement error. Consequently, a measurement error of the current speed can be reduced, and divergence near the stop position can be suppressed, thereby stabilizing the positioning control.

The paper conveying apparatus 3 according to a sixth modification of the third embodiment is different from the paper conveying apparatus of the third embodiment in that the speed corrector 106*b* of the digital speed controlling apparatus 13 is different. In this sixth modification, the speed corrector 106*b* is disposed at the position of the speed corrector 106 according to the third embodiment. Configurations and operations of other elements are the same as those according to the third embodiment. Therefore, their explanation is omitted or simplified, and mainly different points are explained below.

In the sixth modification, the speed corrector 106*b* has a memory (not shown), and always stores displacement of the past predetermined number of sampling. The speed corrector 106*b* estimates the current target speed from the past displacement and the current displacement. The algorithm of prediction includes linear prediction and moving-average prediction.

When the determination result that is input from the stop control state determining unit 135 is that the conveyor belt 301 is in the stop control state, the speed corrector 106*b* outputs a corrected target speed that is predicted and calculate by the speed corrector 106*b*.

A difference of the speed control procedure is explained as follows. At step S305 shown in FIG. 6B, the speed corrector 106*b* calculates a prediction value, forcibly replaces the target speed with the calculated prediction value, and outputs the prediction value, thereby performing correction. At step S306, the speed error calculator 103 calculates a speed error between the prediction value obtained by replacement by the speed corrector 106*b* and the current speed.

As explained above, in the state of receiving position control, when the displacement corresponds to one pulse, the digital speed controlling apparatus according to the sixth modification calculates a prediction value and corrects the current speed, thereby performing the speed control using the current speed having a small measurement error. As a result, a measurement error of the current speed can be reduced, and divergence can be suppressed near the stop position, thereby stabilizing the positioning control.

As explained above, the digital speed controlling apparatus according to the embodiment corrects the current speed using a prediction value in the stop control state at a relatively slow speed, thereby performing the speed control using the current speed having a small measurement error. Therefore, the control can be stabilized.

Figure 7:
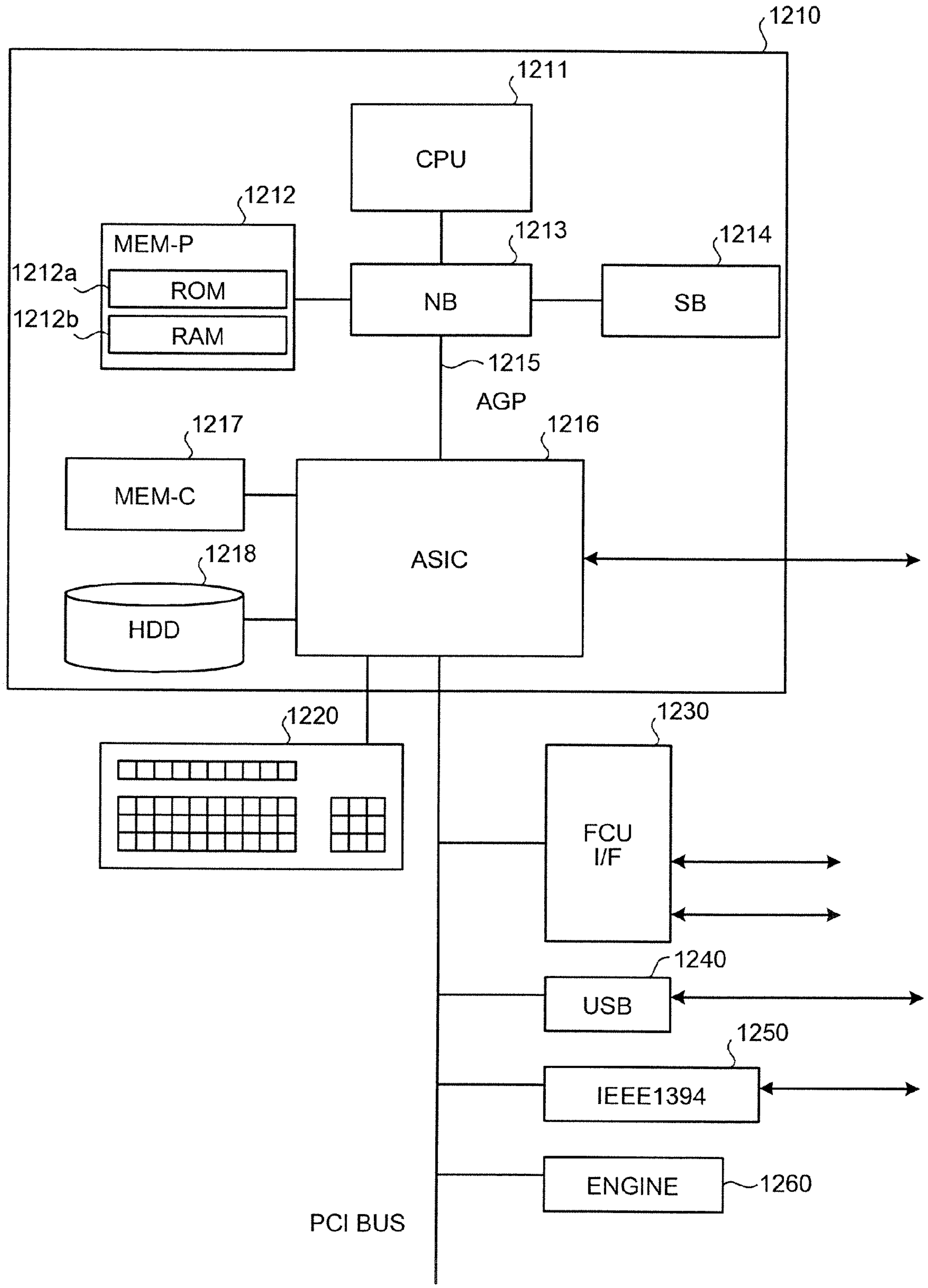
FIG. 7 is a block diagram of a hardware configuration of an inkjet printer.
Figure 8:
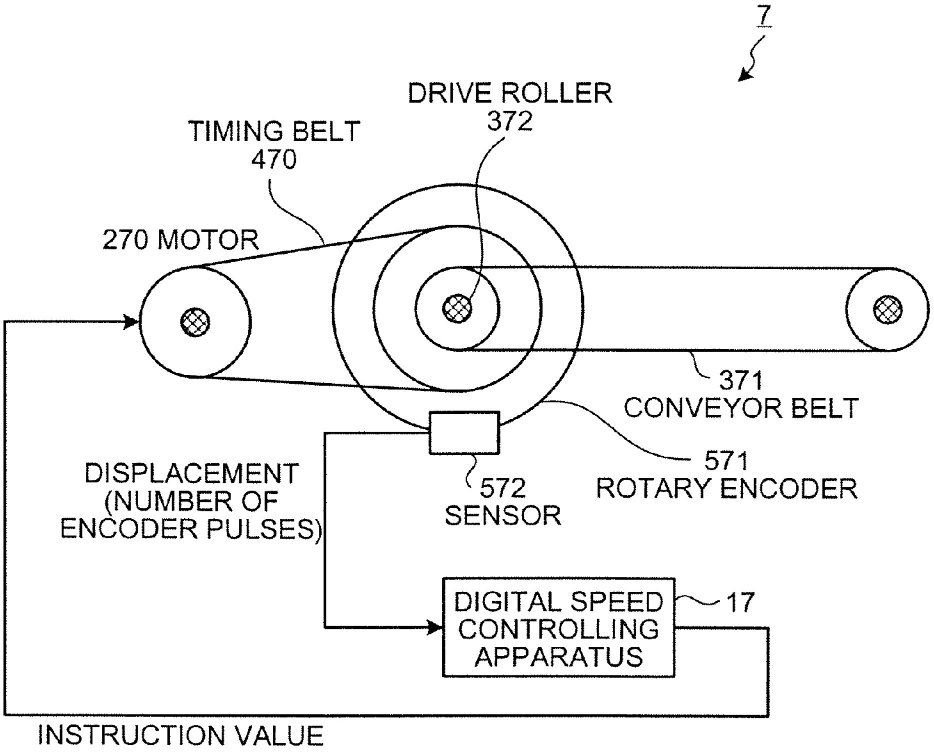
FIG. 8 is an explanatory diagram of motor control of a paper conveyor system performed by a conventional digital speed controlling apparatus.
Figure 9:
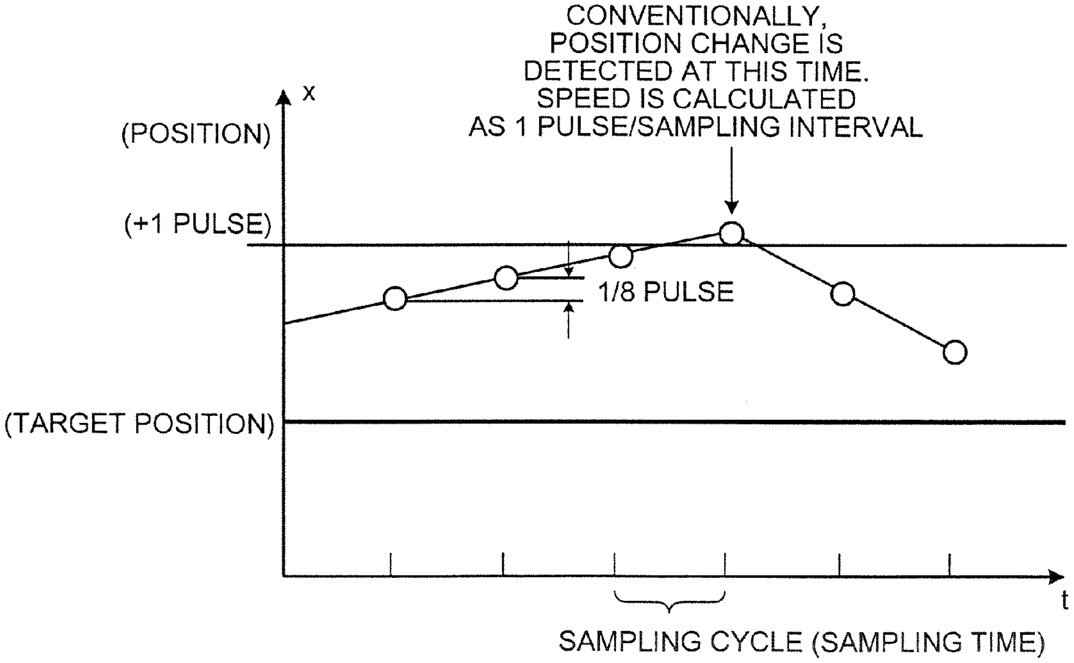
FIG. 9 is a schematic diagram of one example of speed of a conveyor belt near a stop position according to the conventional digital speed controlling apparatus.

FIG. 7 is a block diagram of a hardware configuration of an inkjet printer. This inkjet printer is constituted as a multifunction product having multifunction of a facsimile, a scanner, and the like. As shown in FIG. 7, this inkjet printer has a controller 1210 and an engine 1260 connected together via a peripheral component interconnect (PCI) bus. The controller 1210 performs total control of the inkjet printer and controls inputs from an FCUI/F1230 and an operating unit 1220, including display process by a display unit, various controls by a control unit, and image formation by an image forming unit. The engine 1260 is an image processing engine that can be connected to the PCI bus, and includes an image process such as error diffusion and gamma conversion of obtained image data.

The controller 1210 has a CPU 1211, a north bridge (NB) 1213, a system memory (MEM-P) 1212, a south bridge (SB) 1214, a local memory (MEM-C) 1217, an application specific integrated circuit (ASIC) 1216, and a hard disk drive 1218. The north bridge 1213 and the ASIC 1216 are connected together via an accelerated graphics port (AGP) bus 1215. The MEM-P 1212 has a read only memory (ROM) 1212*a*, and a random access memory (RAM) 1212*b*.

The CPU 1211 performs total control of the inkjet printer, has a chip set consisting of the NB 1213, the MEM-P 1212, and the SB 1214, and is connected to other devices via this chip set.

The NB 1213 is a bridge for connecting the CPU 1211 to the MEM-P 1212, the SB 1214, and the AGP 1215, and has a memory controller that controls reading and writing to the MEM-P 1212, a PCI master, and an AGP target.

The MEM-P 1212 is a system memory that is used as a storage memory of a program and data, and as a development memory of a program and data, and consists of the ROM 1212*a* and the RAM 1212*b*. The ROM 1212*a* is used as a storage memory of a program and data. The RAM 1212*b* is a readable and writable memory that is used as a development memory of a program and data, and an image drawing memory at the image processing time.

The SB 1214 is a bridge that connects between the NB 1213, the PCI device, and a peripheral device. This SB 1214 is connected to the NB 1213 via the PCI bus. The PCI bus is also connected to the FCUI/F 1230 and the like.

The ASIC 1216 is an integrated circuit (IC) for multimedia information process having a hardware element for multimedia information process, and functions as a bridge that connects the AGP 1215, the PCI bus, the HDD 1218, and the MEM-C 1217.

The ASIC 1216 is connected to a universal serial bus (USB) 1240 and the Instituted of Electrical and Electronics Engineers (IEEE) 1394 interface 1250 via the PCI bus, among a PCI target and an AGP master, an arbiter (ARB) that forms a core of the ASIC 1216, the memory controller that controls the MEM-C 1217, plural direct memory access controllers (DMAC) that rotate image data based on a hardware logic and the like, and an engine 1260.

The MEM-C 1217 is a local memory that is used as a transmission image buffer and a code buffer. The HDD 1218 is a storage that stores image data, a program, font data, and a form.

The AGP 1215 is a bus interface for a graphics accelerator card that is proposed to increase the graphic processing speed. The AGP 1215 directly accesses the MEM-P 1212 in high throughput, thereby increasing the speed of the graphics accelerator card.

The keyboard 1220 that is connected to the ASIC 1216 receives an operation input from an operator, and transmits received operation input information to the ASIC 1216.

A digital speed control program to be executed by the inkjet printer according to this embodiment is provided by being installed in a ROM or the like in advance.

The digital speed control program to be executed by the inkjet printer according to this embodiment can be provided by being recorded on a computer-readable recording medium such as a CD-ROM, a flexible disc (FD), a CD-R, and a digital versatile disk (DVD), in an installable format file or an executable format file.

The digital speed control program to be executed by the inkjet printer according to this embodiment can be stored in a computer connected to a network such as the Internet, and can be downloaded via the network. The digital speed control program to be executed by the inkjet printer according to this embodiment can be provided or distributed via the network such as the Internet.

The digital speed control program to be executed by the inkjet printer according to this embodiment has a module configuration including the units described above (the target speed calculator 101, the current speed calculator 102, the speed error calculator 103, the automatic controller 104, the target speed determining unit 105, and the speed corrector 106). As actual hardware, the CPU (processor) reads the digital speed control program from the ROM, and executes this program, thereby loading the above units in the main storage device. As a result, the target speed calculator 101, the current speed calculator 102, the speed error calculator 103, the automatic controller 104, the target speed determining unit 105, and the speed corrector 106 are generated in the main storage device.

According to the present invention, a displacement detector obtains displacement of the movable body detected by the detector, by an integral multiple of minimum unit displacement corresponding to a sampling cycle. A target speed calculator calculates a target speed of the movable body based on lapse of a sampling time. A current speed calculator calculates a current speed of the movable body, based on displacement and a difference of a sampling time at that time. A target speed determining unit determines whether a target speed is smaller than a predetermined value. A speed corrector replaces the current speed with a value set in advance, when the target speed is smaller than the predetermined value and also when the current speed is the minimum unit displacement per the sampling cycle. A speed error calculator calculates an error between a value set in advance and the target speed. A controller controls the driving unit based on a calculated speed error. With this configuration, a stable closed-loop digital speed controlling apparatus that can reduce oscillation of the controlled system due to an error of the measured current speed near the stop position where the current speed of the movable body is slow, can be provided.

According to the present invention, with this configuration, a stable closed-loop digital speed controlling apparatus that can reduce oscillation of the controlled system due to an error of the measured current speed near the stop position where the current speed of the movable body is slow, can be provided.

According to the present invention, with this configuration, a stable closed-loop digital speed controlling apparatus that can reduce oscillation of the controlled system due to an error of the measured current speed near the stop position where the current speed of the movable body is slow, can be provided.

According to the present invention, with this configuration, a stable closed-loop digital speed controlling apparatus that can reduce oscillation of the controlled system due to an error of the measured current speed near the stop position where the current speed of the movable body is slow, can be provided.

According to the present invention, a displacement detector obtains displacement of the movable body detected by the detector, by an integral multiple of minimum unit displacement corresponding to a sampling cycle. A target speed calculator calculates a target speed of the movable body based on lapse of a sampling time. A current speed calculator calculates a current speed of the movable body, based on displacement and a difference of a sampling time at that time. A stop state determining unit determines whether the movable body is in a stop state, based on displacement of the movable body. A speed corrector replaces the current speed with a value set in advance, when the stop state determining unit determines that the movable body is in a stop state and also when the current speed calculator calculates that the current speed is the minimum unit displacement per the sampling cycle. A speed error calculator calculates an error between a set value to which the current speed is replaced and the target speed. A controller controls the driving unit based on a calculated speed error. With this configuration, a stable closed-loop digital speed controlling apparatus that can reduce oscillation of the controlled system due to an error of the measured current speed in a stop state near the stop position where the current speed of the movable body is slow, can be provided.

According to the present invention, the current speed is replaced with zero, thereby controlling the driving unit. With this configuration, a stable closed-loop digital speed controlling apparatus that can reduce oscillation of the controlled system due to an error of the measured current speed in a stop state near the stop position where the current speed of the movable body is slow, can be provided.

According to the present invention, with this configuration, a stable closed-loop digital speed controlling apparatus that can reduce oscillation of the controlled system due to an error of the measured current speed in a stop state near the stop position where the current speed of the movable body is slow, can be provided.

According to the present invention, the current speed is replaced with a prediction value determined from past plural displacements, thereby controlling the driving unit. With this configuration, a stable closed-loop digital speed controlling apparatus that can reduce oscillation of the controlled system due to an error of the measured current speed in a stop state near the stop position where the current speed of the movable body is slow, can be provided.

According to the present invention, with this configuration, a stable closed-loop digital speed controlling apparatus that can reduce oscillation of the controlled system due to an error of the measured current speed in a stop state near the stop position where the current speed of the movable body is slow, can be provided.

According to the present invention, a displacement detector obtains displacement of the movable body detected by the detector, by an integral multiple of minimum unit displacement corresponding to a sampling cycle. A target speed calculator calculates a target speed of the movable body based on lapse of a sampling time. A current speed calculator calculates a current speed of the movable body, based on displacement and a difference of a sampling time at that time. A stop control determining unit determines whether the movable body is in a stop control state for receiving stop operation control near the stop position, based on displacement of the movable body. A speed corrector replaces the current speed with a value set in advance, when the stop control determining unit determines that the movable body is in a stop control state and also when the current speed calculator calculates that the current speed is the minimum unit displacement per the sampling cycle. A speed error calculator calculates an error between a set value to which the current speed is replaced and the target speed. A controller controls the driving unit based on a calculated speed error. With this configuration, a stable closed-loop digital speed controlling apparatus that can reduce oscillation of the controlled system due to an error of the measured current speed in a stop state near the stop position where the current speed of the movable body is slow, can be provided.

According to the present invention, the current speed is replaced with zero, thereby controlling the driving unit. With this configuration, a stable closed-loop digital speed controlling apparatus that can reduce oscillation of the controlled system due to an error of the measured current speed in a stop state near the stop position where the current speed of the movable body is slow, can be provided.

According to the present invention, the speed corrector replaces the current speed with the minimum unit displacement divided by a difference between a sampling time calculated by the current speed calculator as the minimum unit displacement and a sampling time at which displacement of the last nearest position is calculated. With this configuration, a stable closed-loop digital speed controlling apparatus that can reduce oscillation of the controlled system due to an error of the measured current speed in a stop state near the stop position where the current speed of the movable body is slow, can be provided.

According to the present invention, the current speed is replaced with a prediction value determined from past plural displacements, thereby controlling the driving unit. With this configuration, a stable closed-loop digital speed controlling apparatus that can reduce oscillation of the controlled system due to an error of the measured current speed in a stop state near the stop position where the current speed of the movable body is slow, can be provided.

According to the present invention, when detected displacement of the movable body is within a predetermined range, the stop control determining unit determines that the movable body is in the stop control state, thereby controlling the driving unit. With this configuration, a stable closed-loop digital speed controlling apparatus that can reduce oscillation of the controlled system due to an error of the measured current speed in a stop state near the stop position where the current speed of the movable body is slow, can be provided.

According to the present invention, the stop control determining unit determines that the movable body is in the stop control state, when the detected displacement of the movable body is within a predetermined range during a certain period of time, thereby controlling the driving unit. With this configuration, a stable closed-loop digital speed controlling apparatus can be provided that can reduce oscillation of the controlled system due to an error of the measured current speed near the stop position where the current speed of the movable body is slow.

According to the present invention, a digital motor controlling apparatus makes a detector detect displacement of a movable body that is moved by digitally controlling a rotation of a motor. A displacement detector obtains displacement of the movable body detected by the detector, by an integral multiple of minimum unit displacement corresponding to a sampling cycle. A target speed calculator calculates a target speed of the movable body based on lapse of a sampling time. A current speed calculator calculates a current speed of the movable body, based on displacement and a difference of a sampling time at that time. A target speed determining unit determines whether a target speed is smaller than a predetermined value. A speed corrector replaces the current speed with a value set in advance, when the target speed determining unit determines that the target speed is smaller than the predetermined value and also when the current speed calculator calculates that the current speed is the minimum unit displacement per the sampling cycle. A speed error calculator calculates an error between a set value to which the current speed is replaced and the target speed. A controller controls the driving unit based on a calculated speed error. With this configuration, a stable closed-loop digital speed controlling apparatus that can reduce oscillation of the controlled system due to an error of the measured current speed near the stop position where the current speed of the movable body is slow, can be provided.

According to the present invention, a displacement detector obtains displacement of the movable body detected by the detector, by an integral multiple of minimum unit displacement corresponding to a sampling cycle. A target speed calculator calculates a target speed of the movable body based on lapse of a sampling time. A current speed calculator calculates a current speed of the movable body, based on displacement and a difference of a sampling time. A target speed determining unit determines whether a calculated target speed is smaller than a predetermined value. A speed corrector replaces the current speed with a value set in advance, when the target speed determining unit determines that the calculated target speed is smaller than the predetermined value and also when the current speed calculator calculates that the current speed is the minimum unit displacement per the sampling cycle. A speed error calculator calculates an error between a set value to which the current speed is replaced and the target speed. A controller controls a motor based on a calculated speed error. With this configuration, a paper conveying apparatus including a stable closed-loop digital speed controlling apparatus that can reduce oscillation of the controlled system due to an error of the measured current speed near the stop position where the current speed of the movable body is slow, can be provided.

According to the present invention, a displacement detector obtains displacement of the movable body detected by the detector, by an integral multiple of minimum unit displacement corresponding to a sampling cycle. A target speed calculator calculates a target speed of the movable body based on lapse of a sampling time. A current speed calculator calculates a current speed of the movable body, based on displacement and a difference of a sampling time at that time. A target speed determining unit determines whether a target speed is smaller than a predetermined value. A speed corrector replaces the current speed with a value set in advance, when the target speed determining unit determines that the target speed is smaller than the predetermined value and also when the current speed calculator calculates that the current speed is the minimum unit displacement per the sampling cycle. A speed error calculator calculates an error between a set value to which the current speed is replaced and the target speed. A controller controls the driving unit based on a calculated speed error. With this configuration, a stable closed-loop digital speed controlling apparatus that can reduce oscillation of the controlled system due to an error of the measured current speed near the stop position where the current speed of the movable body is slow, can be provided.

According to the present invention, a displacement detector obtains displacement of the movable body detected by the detector, by an integral multiple of minimum unit displacement corresponding to a sampling cycle. A target speed calculator calculates a target speed of the movable body based on lapse of a sampling time. A current speed calculator calculates a current speed of the movable body, based on displacement and a difference of a sampling time at that time. A stop state determining unit determines whether the movable body is in a stop state, based on displacement of the movable body. A speed corrector replaces the current speed with a value set in advance, when the stop state determining unit determines that the movable body is in a stop state and also when the current speed calculator calculates that the current speed is the minimum unit displacement per the sampling cycle. A speed error calculator calculates an error between a set value to which the current speed is replaced and the target speed. A controller controls the driving unit based on a calculated speed error. With this configuration, a stable closed-loop digital speed controlling apparatus that can reduce oscillation of the controlled system due to an error of the measured current speed in a stop state near the stop position where the current speed of the movable body is slow, can be provided.

According to the present invention, a displacement detector obtains displacement of the movable body detected by the detector, by an integral multiple of minimum unit displacement corresponding to a sampling cycle. A target speed calculator calculates a target speed of the movable body based on lapse of a sampling time. A current speed calculator calculates a current speed of the movable body, based on displacement and a difference of a sampling time. A stop control determining unit determines whether the movable body is in a stop control state for receiving stop operation control near the stop position, based on displacement of the movable body. A speed corrector replaces the current speed with a value set in advance, when the stop control determining unit determines that the movable body is in a stop control state and also when the current speed calculator calculates that the current speed is the minimum unit displacement per the sampling cycle. A speed error calculator calculates an error between a set value to which the current speed is replaced and the target speed. A controller controls the driving unit based on a calculated speed error. With this configuration, a stable closed-loop digital speed controlling apparatus that can reduce oscillation of the controlled system due to an error of the measured current speed in a stop control state near the stop position where the current speed of the movable body is slow, can be provided.

According to the present invention, a displacement detector obtains displacement of a movable body of a conveying apparatus of an image forming apparatus detected by a detector of a digital speed controlling apparatus, by an integral multiple of minimum unit displacement corresponding to a sampling cycle of the digital speed controlling apparatus. A target speed calculator calculates a target speed of the movable body based on lapse of a sampling time. A current speed calculator calculates a current speed of the movable body, based on displacement and a difference of a sampling time at that time. A target speed determining unit determines whether a target speed is smaller than a predetermined value. A speed corrector replaces the current speed with a value set in advance, when the target speed determining unit determines that the target speed is smaller than the predetermined value and also when the current speed calculator calculates that the current speed is the minimum unit displacement per the sampling cycle. A speed error calculator calculates an error between a set value to which the current speed is replaced and the target speed. A controller controls the driving unit based on a calculated speed error. The image forming apparatus outputs an image. With this configuration, an image forming apparatus that can reduce oscillation of the controlled system due to an error of the measured current speed near the stop position where the current speed of the movable body that conveys the recording medium is slow, and also that perform a stable closed-loop digital speed control, can be provided.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A closed-loop digital speed controlling apparatus that makes a sensor detect displacement of a movable body that is moved by digitally controlling a driving unit, and controls stop of the movable body, the digital speed controlling apparatus comprising:

a displacement detector that obtains displacement of the movable body detected by the sensor, by an integral multiple of minimum unit displacement corresponding to a sampling cycle;

a target speed calculator that calculates a target speed of the movable body based on the lapse of a sampling time;

a current speed calculator that calculates a current speed of the movable body, based on displacement detected by the displacement detector and a difference of a sampling time for detecting the displacement;

a target speed determining unit that determines whether a target speed calculated by the target speed calculator is smaller than a predetermined value;

a speed corrector that replaces the current speed with a value set in advance, when the target speed determining unit determines that the target speed is smaller than the predetermined value and also when the current speed calculator calculates that the current speed is the minimum unit displacement per the sampling cycle;

a speed error calculator that calculates an error between the set value to which the current speed is replaced by the speed corrector and the target speed; and a controller that controls the driving unit based on a speed error calculated by the speed error calculator.

2. The digital speed controlling apparatus according to claim 1, wherein the speed corrector replaces the current speed with zero.

3. The digital speed controlling apparatus according to claim 1, wherein the speed corrector replaces the current speed with the minimum unit displacement divided by a difference between a sampling time calculated by the current speed calculator as the minimum unit displacement and a sampling time at which displacement of the last nearest position is calculated.

4. The digital speed controlling apparatus according to claim 1, wherein the speed corrector replaces the current speed with a prediction value determined from a plurality of previous displacements.

5. A closed-loop digital speed controlling apparatus that makes a sensor detect displacement of a movable body that is moved by digitally controlling a driving unit, and controls stop of the movable body, the digital speed controlling apparatus comprising:

a displacement detector that obtains displacement of the movable body detected by the sensor, by an integral multiple of minimum unit displacement corresponding to a sampling cycle;

a target speed calculator that calculates a target speed of the movable body based on the lapse of a sampling time;

a current speed calculator that calculates a current speed of the movable body, based on displacement detected by the displacement detector and a difference of a sampling time for detecting the displacement;

a stop state determining unit that determines whether the movable body is in a stop state, based on displacement of the movable body detected by the displacement detector;

a speed corrector that replaces the current speed with a value set in advance, when the stop state determining unit determines that the movable body is in a stop state and also when the current speed calculator calculates that the current speed is the minimum unit displacement per the sampling cycle;

a speed error calculator that calculates an error between the set value to which the current speed is replaced by the speed corrector and the target speed; and a controller that controls the driving unit based on a speed error calculated by the speed error calculator.

6. The digital speed controlling apparatus according to claim 5, wherein the speed corrector replaces the current speed with zero.

7. The digital speed controlling apparatus according to claim 5, wherein the speed corrector replaces the current speed with the minimum unit displacement divided by a difference between a sampling time calculated by the current speed calculator as the minimum unit displacement and a sampling time at which displacement of the last nearest position is calculated.

8. The digital speed controlling apparatus according to claim 5, wherein the speed corrector replaces the current speed with a prediction value determined from a plurality of previous displacements.

9. The digital speed controlling apparatus according to claim 5, wherein the stop state determining unit determines that the movable body is in the stop state, when the detected displacement of the movable body continues at a predetermined value during a predetermined time.

10. A closed-loop digital speed controlling apparatus that makes a sensor detect displacement of a movable body that is moved by digitally controlling a driving unit, and controls stop of the movable body, the digital speed controlling apparatus comprising:

a displacement detector that obtains displacement of the movable body detected by the sensor, by an integral multiple of minimum unit displacement corresponding to a sampling cycle;

a target speed calculator that calculates a target speed of the movable body based on the lapse of a sampling time;

a current speed calculator that calculates a current speed of the movable body, based on displacement detected by the displacement detector and a difference of a sampling time for detecting the displacement;

a stop control determining unit that determines whether the movable body is in a stop control state for receiving a stop operation control near the stop position, based on displacement of the movable body detected by the displacement detector;

a speed corrector that replaces the current speed with a value set in advance, when the stop control determining unit determines that the movable body is in a stop control state and also when the current speed calculator calculates that the current speed is the minimum unit displacement per the sampling cycle;

a speed error calculator that calculates an error between the set value to which the current speed is replaced by the speed corrector and the target speed; and a controller that controls the driving unit based on a speed error calculated by the speed error calculator.

11. The digital speed controlling apparatus according to claim 10, wherein the speed corrector replaces the current speed with zero.

12. The digital speed controlling apparatus according to claim 10, wherein the speed corrector replaces the current speed with the minimum unit displacement divided by a difference between a sampling time calculated by the current speed calculator as the minimum unit displacement and a sampling time at which displacement of the last nearest position is calculated.

13. The digital speed controlling apparatus according to claim 10, wherein the speed corrector replaces the current speed with a prediction value determined from a plurality of previous displacements.

14. The digital speed controlling apparatus according to claim 10, wherein the stop control determining unit determines that the movable body is in the stop control state, based on the detected displacement of the movable body.

15. The digital speed controlling apparatus according to claim 10, wherein the stop control determining unit determines that the movable body is in the stop control state, when the detected displacement of the movable body is within a predetermined range during a certain period of time.

16. A digital motor controlling apparatus that makes a sensor detect displacement of a movable body that is moved by digitally controlling a rotation of a motor, and controls stop of the movable body, the digital motor controlling apparatus comprising:

a displacement detector that obtains displacement of the movable body detected by the sensor, by an integral multiple of minimum unit displacement corresponding to a sampling cycle;

a target speed calculator that calculates a target speed of the movable body based on the lapse of a sampling time;

a current speed calculator that calculates a current speed of the movable body, based on displacement detected by the displacement detector and a difference of a sampling time for detecting the displacement;

a target speed determining unit that determines whether a target speed calculated by the target speed calculator is smaller than a predetermined value;

a speed corrector that replaces the current speed with a value set in advance, when the target speed determining unit determines that the target speed is smaller than the predetermined value and also when the current speed calculator calculates that the current speed is the minimum unit displacement per the sampling cycle;

a speed error calculator that calculates an error between the set value to which the current speed is replaced by the speed corrector and the target speed; and a controller that controls the driving unit based on a speed error calculated by the speed error calculator.

17. A paper conveying apparatus including a paper conveying unit that conveys paper based on a rotation of a motor, and a digital motor controlling apparatus that makes a sensor detect displacement of a movable body that is moved by digitally controlling a rotation of the motor of the paper conveying unit, and controls stop of the movable body, the digital motor controlling apparatus comprising:

a displacement detector that obtains displacement of the movable body detected by the sensor, by an integral multiple of minimum unit displacement corresponding to a sampling cycle;

a target speed calculator that calculates a target speed of the movable body based on the lapse of a sampling time;

a current speed calculator that calculates a current speed of the movable body, based on displacement detected by the displacement detector and a difference of a sampling time for detecting the displacement;

a target speed determining unit that determines whether a target speed calculated by the target speed calculator is smaller than a predetermined value;

a speed corrector that replaces the current speed with a value set in advance, when the target speed determining unit determines that the target speed is smaller than the predetermined value and also when the current speed calculator calculates that the current speed is the minimum unit displacement per the sampling cycle;

a speed error calculator that calculates an error between the set value to which the current speed is replaced by the speed corrector and the target speed; and a controller that controls the rotation of the motor based on a speed error calculated by the speed error calculator.

18. A method of closed-loop digital speed controlling for detecting a displacement of a movable body that is moved by a driving unit, and controlling stop of the movable body, said method comprising:

detecting a displacement of the movable body by an integral multiple of minimum unit displacement corresponding to a sampling cycle;

calculating a target speed of the movable body based on the lapse sampling time;

calculating a current speed of the movable body, based on the detected displacement and a difference of a sampling time for detecting the displacement;

determining a target speed whether the target speed calculated at the calculating of the target speed is smaller than a predetermined value;

replacing the current speed with a value set in advance, when the target speed is determined to be smaller than the predetermined value, and also when the current speed is calculated to be the minimum unit displacement with respect to the sampling cycle;

calculating an error between the set value to which the current speed is replaced and the target speed; and controlling the driving unit based on a speed error calculated.

19. A method of closed-loop digital speed controlling for detecting displacement of a movable body that is moved by a driving unit, and controlling stop of the movable body, said method comprising:

detecting displacement of the movable body by an integral multiple of minimum unit displacement corresponding to a sampling cycle;

calculating a target speed of the movable body based on the lapse sampling time;

calculating a current speed of the movable body, based on the detected displacement and a difference of a sampling time for detecting the displacement;

determining whether the movable body is in a stop state, based on displacement of the movable body detected at the detecting of displacement;

replacing the current speed with a value set in advance, when the movable body is in a stop state, and also when the current speed is calculated to be the minimum unit displacement with respect to the sampling cycle;

calculating an error between the set value to which the current speed is replaced and the target speed; and controlling the driving unit based on a speed error calculated.

20. A method of closed-loop digital speed controlling for detecting displacement of a movable body that is moved by a driving unit, and controlling stop of the movable body, said method comprising:

detecting displacement of the movable body by an integral multiple of minimum unit displacement corresponding to a sampling cycle;

calculating a target speed of the movable body based on the lapse sampling time;

calculating a current speed of the movable body, based on the detected displacement and a difference of a sampling time for detecting the displacement;

determining whether the movable body is in a stop control state for receiving a stop operation control near the stop position, based on displacement of the movable body detected at the detecting of displacement;

replacing the current speed with a value set in advance, when the target speed is determined to be in a stop control state, and also when the current speed is calculated to be the minimum unit displacement with respect to the sampling cycle;

calculating an error between the set value to which the current speed is replaced and the target speed; and controlling the driving unit based on a speed error calculated at the calculating of an error.

21. A computer-readable recording medium that stores a program for making a computer execute a method of closed-loop digital speed controlling for detecting a displacement of a movable body that is moved by a driving unit, and controlling stop of the movable body, said method comprising:

detecting displacement of the movable body by an integral multiple of minimum unit displacement corresponding to a sampling cycle;

calculating a target speed of the movable body based on the lapse sampling time;

calculating a current speed of the movable body, based on the detected displacement and a difference of a sampling time for detecting the displacement;

determining a target speed whether the target speed calculated at the calculating of the target speed is smaller than a predetermined value;

replacing the current speed with a value set in advance, when the target speed is determined to be smaller than the predetermined value, and also when the current speed is calculated to be the minimum unit displacement with respect to the sampling cycle;

calculating an error between the set value to which the current speed is replaced and the target speed; and controlling the driving unit based on a speed error calculated.

22. A computer-readable recording medium that stores a program for making a computer execute a method of closed-loop digital speed controlling for detecting a displacement of a movable body that is moved by a driving unit, and controlling stop of the movable body, said method comprising:

detecting displacement of the movable body by an integral multiple of minimum unit displacement corresponding to a sampling cycle;

calculating a target speed of the movable body based on the lapse sampling time;

calculating a current speed of the movable body, based on the detected displacement and a difference of a sampling time for detecting the displacement;

determining whether the movable body is in a stop state, based on displacement of the movable body detected at the detecting of displacement;

replacing the current speed with a value set in advance, when the movable body is in a stop state, and also when the current speed is calculated to be the minimum unit displacement with respect to the sampling cycle;

calculating an error between the set value to which the current speed is replaced and the target speed; and controlling the driving unit based on a speed error calculated.

23. A computer-readable recording medium that stores a program for making a computer execute a method of closed-loop digital speed controlling for detecting a displacement of a movable body that is moved by a driving unit, and controlling stop of the movable body, said method comprising:

detecting displacement of the movable body by an integral multiple of minimum unit displacement corresponding to a sampling cycle;

calculating a target speed of the movable body based on the lapse sampling time;

calculating a current speed of the movable body, based on the detected displacement and a difference of a sampling time for detecting the displacement;

determining whether the movable body is in a stop control state for receiving a stop operation control near the stop position, based on displacement of the movable body detected at the detecting of displacement;

replacing the current speed with a value set in advance, when the target speed is determined to be in a stop control state, and also when the current speed is calculated to be the minimum unit displacement with respect to the sampling cycle;

calculating an error between the set value to which the current speed is replaced and the target speed; and controlling the driving unit based on a speed error calculated at the calculating of an error.

24. An image forming apparatus comprising:

a conveying apparatus that conveys a recording medium with a movable body that is moved by a driving unit;

a closed-loop digital speed controlling apparatus that makes a detector detect displacement of the movable body conveying the recording medium, and controls the driving unit; and an image output apparatus that forms an image on the recording medium conveyed by the movable body that is moved by the driving unit controlled by the digital speed controlling apparatus and outputs the formed image, wherein the digital speed controlling apparatus includes:

a displacement detector that obtains displacement of the movable body detected by the detector, by an integral multiple of minimum unit displacement corresponding to a sampling cycle;

a target speed calculator that calculates a target speed of the movable body based on lapse of a sampling time;

a current speed calculator that calculates a current speed of the movable body, based on displacement detected by the displacement detector and a difference of a sampling time for detecting the displacement;

a target speed determining unit that determines whether a target speed calculated by the target speed calculator is smaller than a predetermined value;

a speed corrector that replaces the current speed with a value set in advance, when the target speed determining unit determines that the target speed is smaller than the predetermined value and also when the current speed calculator calculates that the current speed is the minimum unit displacement per the sampling cycle;

a speed error calculator that calculates an error between a set value to which the current speed is replaced by the speed corrector and the target speed; and a controller that controls the driving unit based on a speed error calculated by the speed error calculator.

* * * * *